(12) United States Patent
Dan et al.

(10) Patent No.: US 9,089,976 B2
(45) Date of Patent: Jul. 28, 2015

(54) ROBOT HAND AND ROBOT

(71) Applicant: KABUSHIKI KAISHA YASKAWA DENKI, Kitakyushu-shi (JP)

(72) Inventors: Yoichiro Dan, Fukuoka (JP); Go Yamaguchi, Fukuoka (JP)

(73) Assignee: KABUSHIKI KAISHA YASKAWA DENKI, Kitakyushu-shi (JP)

(*) Notice: Subject to any disclaimer, the term of this patent is extended or adjusted under 35 U.S.C. 154(b) by 0 days.

(21) Appl. No.: 14/266,841

(22) Filed: May 1, 2014

(65) Prior Publication Data

US 2014/0232124 A1    Aug. 21, 2014

Related U.S. Application Data

(63) Continuation of application No. PCT/JP2011/075853, filed on Nov. 9, 2011.

(51) Int. Cl.
| | |
|---|---|
| *B66C 1/00* | (2006.01) |
| *B25J 15/08* | (2006.01) |
| *B25J 15/00* | (2006.01) |
| *B25J 15/10* | (2006.01) |

(52) U.S. Cl.
CPC ............. *B25J 15/08* (2013.01); *B25J 15/0009* (2013.01); *B25J 15/10* (2013.01); *Y10S 901/32* (2013.01); *Y10S 901/39* (2013.01)

(58) Field of Classification Search
CPC . B25J 15/0009; B66C 1/422; H01L 21/68707
USPC .................. 294/106, 213; 901/19, 25, 28, 31
See application file for complete search history.

(56) References Cited

U.S. PATENT DOCUMENTS

| | | | | | |
|---|---|---|---|---|---|
| 4,303,269 | A | * | 12/1981 | Faughnan ..................... | 294/198 |
| 4,368,913 | A | * | 1/1983 | Brockmann et al. ......... | 294/106 |
| 4,623,183 | A | * | 11/1986 | Aomori ....................... | 294/86.4 |
| 5,501,498 | A | * | 3/1996 | Ulrich ........................ | 294/106 |
| 5,762,390 | A | * | 6/1998 | Gosselin et al. ............. | 294/106 |
| 6,918,622 | B2 | * | 7/2005 | Kim et al. .................... | 294/106 |
| 7,370,896 | B2 | * | 5/2008 | Anderson et al. ............ | 294/106 |
| 2002/0060465 | A1 | | 5/2002 | Laliberte et al. | |
| 2011/0115244 | A1 | | 5/2011 | Kamon et al. | |
| 2011/0148132 | A1 | * | 6/2011 | Park et al. .................... | 294/106 |
| 2011/0241369 | A1 | | 10/2011 | Kamon et al. | |

FOREIGN PATENT DOCUMENTS

| | | |
|---|---|---|
| CN | 1757490 | 4/2006 |
| CN | 101648381 | 2/2010 |
| JP | 2002-326128 | 11/2002 |
| JP | 2003-534930 | 11/2003 |
| JP | 2005-144582 | 6/2005 |

(Continued)

OTHER PUBLICATIONS

International Search Report for corresponding International Application No. PCT/JP2011/075853, Feb. 7, 2012.

(Continued)

*Primary Examiner* — Jose V Chen
(74) *Attorney, Agent, or Firm* — Mori & Ward, LLP

(57) ABSTRACT

The robot hand includes a frame and finger units which are provided on the frame and grasp an object to be grasped. The finger units include a Scott Russell mechanism, a first parallel link mechanism, and a second parallel link mechanism.

11 Claims, 29 Drawing Sheets

(56) References Cited

FOREIGN PATENT DOCUMENTS

| JP | 2008-183716 | 8/2008 |
|----|-------------|--------|
| JP | 2009-125845 | 6/2009 |
| JP | 2010-131703 | 6/2010 |
| WO | WO 2010/007795 | 1/2010 |

OTHER PUBLICATIONS

International Preliminary Report on Patentability with Translation of Written Opinion of the International Searching Authority for corresponding International Application No. PCT/JP2011/075853, May 13, 2014.

Wu et al., "Hysteresis Model Identification of a Scott-Russell Amplifying Mechanism Actuated by a Piezoelectric Actuator", Department of Mechanical and Automation Engineering National Kaohsiung First University of Science and Technology NSC Project No. 95-221-E-327-001-MY3, 2007.

Lee et al., "Mobility Constraints and Configurations of 3- and 5-bar AKC Mechanisms", 13th World Congress in Mechanism and Machines Sciences, Jun. 19-25, 2011.

Oldham, "The Kinematics and Vibration of Planar Linkage Mechanisms", 1977.

Chinese Office Action for corresponding CN Application No. 201180074670.2, Feb. 28, 2015.

\* cited by examiner

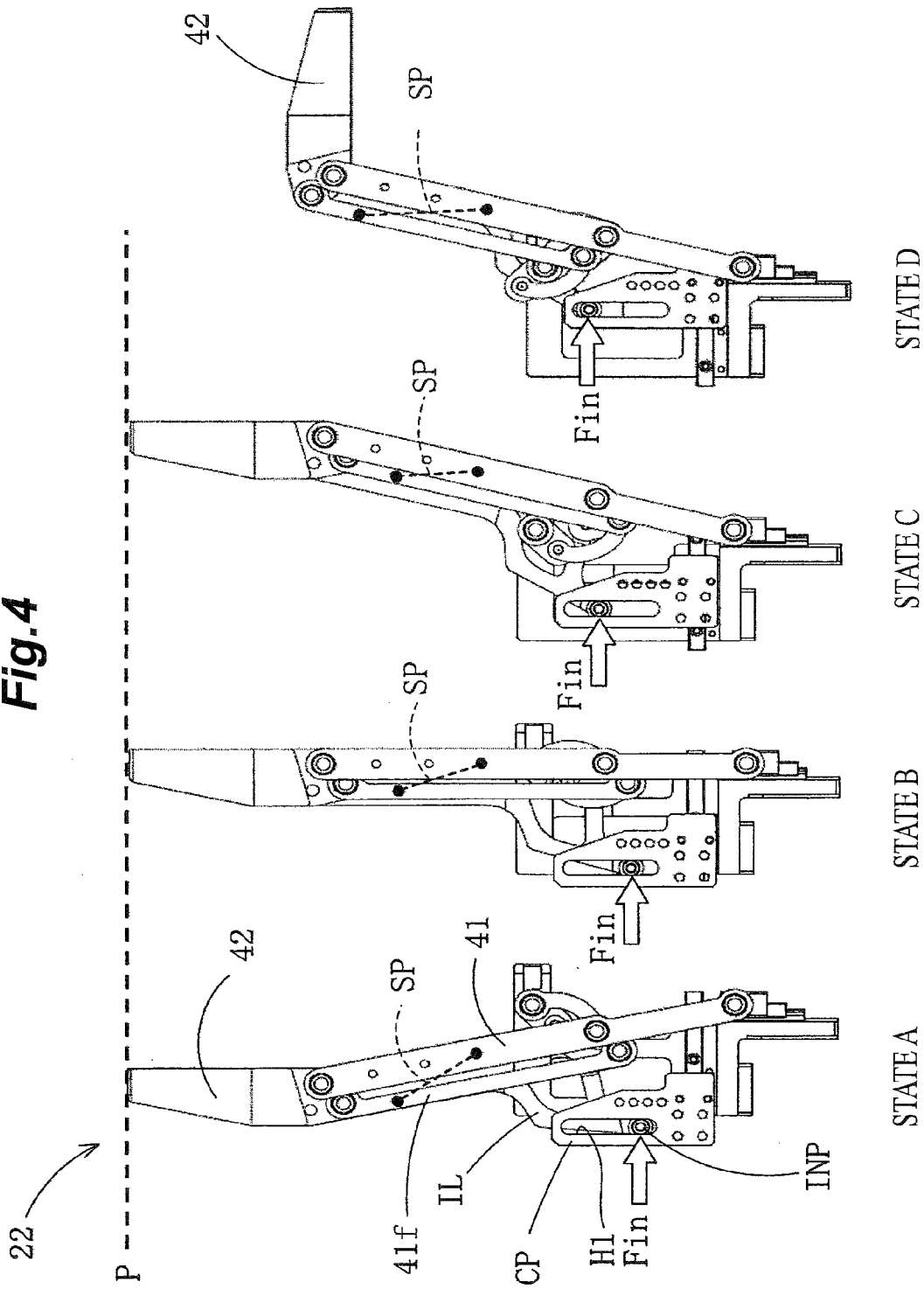

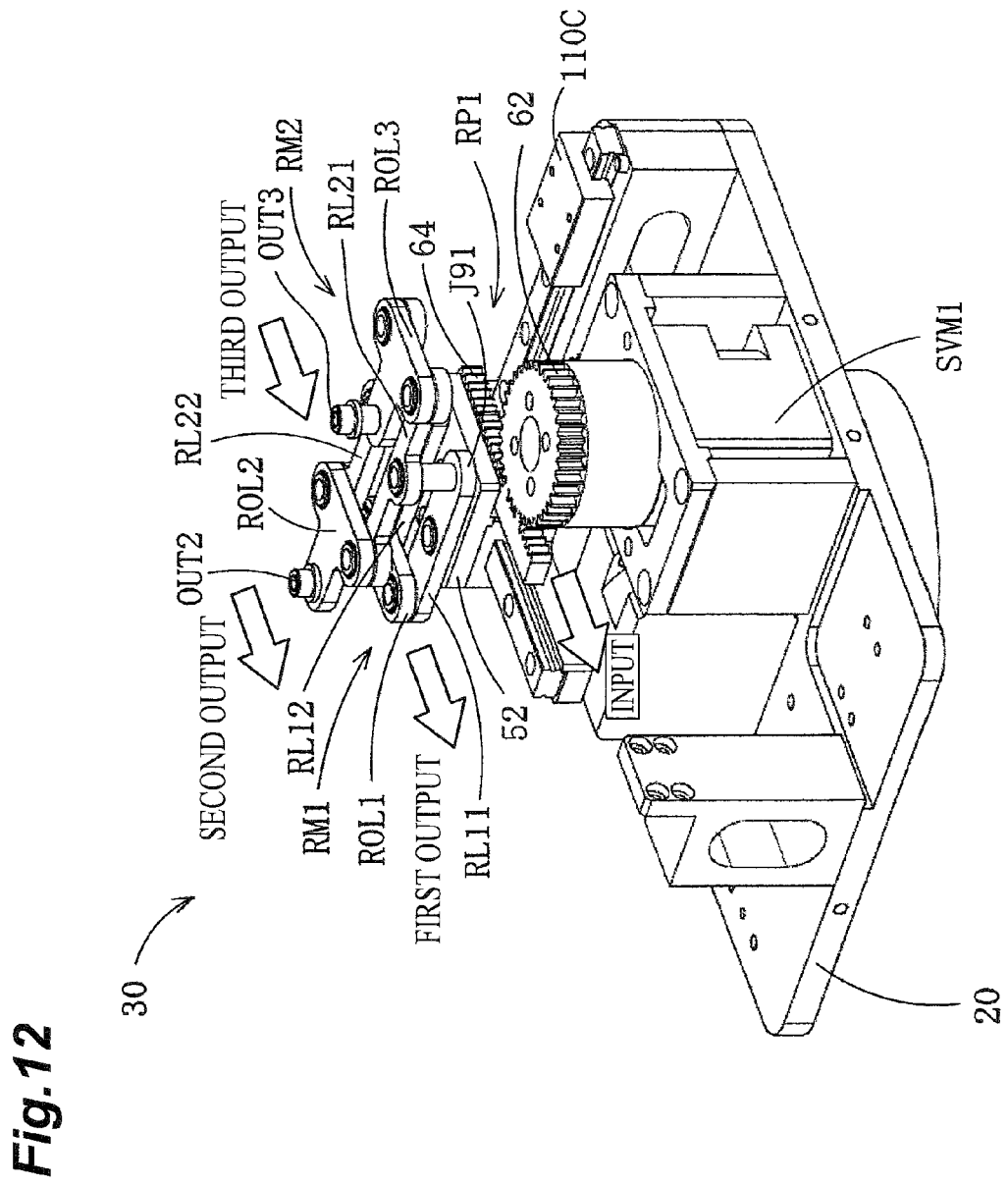

ROBOT HAND AND ROBOT

CROSS-REFERENCE TO RELATED APPLICATIONS

This application is a continuation application of PCT Application No. PCT/JP2011/075853 filed on Nov. 9, 2011, the entire contents of which are incorporated herein by reference.

BACKGROUND

1. Field

This disclosure relates to a robot hand and a robot.

2. Disclosure of the Related Art

In Japanese Patent Application Laid-Open No. 2008-183716, a grasping hand equipped with a plurality of finger mechanisms including a finger joint, an actuator which drives the finger joint, and a link which is supported by the finger joint and operates by the driving force of the actuator is described. The grasping hand is further equipped with an operation control unit which can independently control the actuator of each of the plurality of finger mechanisms, a position detection unit which detects the operating position of the finger joint of each of the plurality of finger mechanisms, and a strain detection unit which is provided to each of the plurality of finger mechanisms and detects the strain produced in the link by the force applied to the finger mechanism. The operation control unit cooperatively controls the actuator of the plurality of finger mechanisms based on the operating position of the finger joint detected by the position detection unit and the strain in the link detected by the strain detection unit so as to adjust the grasping force of the plurality of finger mechanism.

SUMMARY

A robot hand according to an aspect of this disclosure includes: a frame; and at least two finger units which are provided on the frame and grasp an object to be grasped, wherein each of the finger units includes a finger frame provided on the frame, a Scott Russell mechanism configured with at least a swing lever member and a conversion link member, wherein one of end portions of the swing lever member is pivotally connected to the finger frame, and wherein the conversion link member is pivotally connected, at a connecting portion located in a middle portion thereof, to an other end portion of the swing lever member so as that one of end portions of the conversion link member moves in a direction intersecting with a moving direction of an other end portion of the conversion link member, and is allowed to make contact with the object to be grasped, a first parallel link mechanism configured with at least the swing lever member and a common link member pivotally connected to the connecting portion, and a second parallel link mechanism configured with at least the common link member, the conversion link member, a distal end portion link member and a facing conversion link member, wherein the distal end portion link member is arranged in a position so as to face the common link member and is pivotally connected to the other end portion of the conversion link member, and can make contact with the object to be grasped, and wherein the facing conversion link member is arranged in a position so as to face the conversion link member and is pivotally connected to each of the common link member and the distal end portion link member.

A robot hand according to another aspect of this disclosure includes: a frame; first to third finger units which are provided on the frame and grasp an object to be grasped; a Roberval unit for driving the first to third finger units; and a servo motor provided on the frame and driving the Roberval unit, wherein each of the first to third finger units includes a finger frame provided on the frame, a Scott Russell mechanism configured with at least a swing lever member and a conversion link member, wherein one of end portions of the swing lever member is pivotally connected to the finger frame, and wherein the conversion link member is pivotally connected, at a connecting portion located in a middle portion thereof, to an other end portion of the swing lever member so as that one of end portions of the conversion link member moves in a direction intersecting with a moving direction of an other end portion of the conversion link member, and is allowed to make contact with the object to be grasped, a first parallel link mechanism configured with at least the swing lever member and a common link member pivotally connected to the connecting portion, and a second parallel link mechanism configured with at least the common link member, the conversion link member, a distal end portion link member and a facing conversion link member, wherein the distal end portion link member is arranged in a position so as to face the common link member and is pivotally connected to the other end portion of the conversion link member, and can make contact with the object to be grasped, and wherein the facing conversion link member is arranged in a position so as to face the conversion link member and is pivotally connected to each of the common link member and the distal end portion link member, and wherein the Roberval unit includes a first Roberval mechanism which divides an output of the servo motor into an intermediate output and a first output for driving the first finger unit, and a second Roberval mechanism which divides the intermediate output into a second output for driving the second finger unit and a third output for driving the third finger unit.

A robot according to another aspect of this disclosure includes a robot hand including a frame and at least two finger units which are provided on the frame and grasp an object to be grasped, wherein each of the finger units includes a finger frame provided on the frame, a Scott Russell mechanism configured with at least a swing lever member and a conversion link member, wherein one of end portions of the swing lever member is pivotally connected to the finger frame, and wherein the conversion link member is pivotally connected, at a connecting portion located in a middle portion thereof, to an other end portion of the swing lever member so as that one of end portions of the conversion link member moves in a direction intersecting with a moving direction of an other end portion of the conversion link member, and is allowed to make contact with the object to be grasped, a first parallel link mechanism configured with at least the swing lever member and a common link member pivotally connected to the connecting portion, and a second parallel link mechanism configured with at least the common link member, the conversion link member, a distal end portion link member and a facing conversion link member, wherein the distal end portion link member is arranged in a position so as to face the common link member and pivotally connected to the other end portion of the conversion link member, and can make contact with the object to be grasped, and wherein the facing conversion link member is arranged in a position so as to face the conversion link member and is pivotally connected to each of the common link member and the distal end portion link member.

BRIEF DESCRIPTION OF THE DRAWINGS

FIG. 4 is an explanatory view illustrating an operation of the finger unit included in the robot hand.

FIG. 12 is a perspective view of a Roberval unit included in the robot hand.

DETAILED DESCRIPTION

Now, referring to the attached drawings, an embodiment will be described. Note that, in each drawing, a portion not related to the description (e.g., a power line or a signal line) may not be illustrated.

Figure 1:
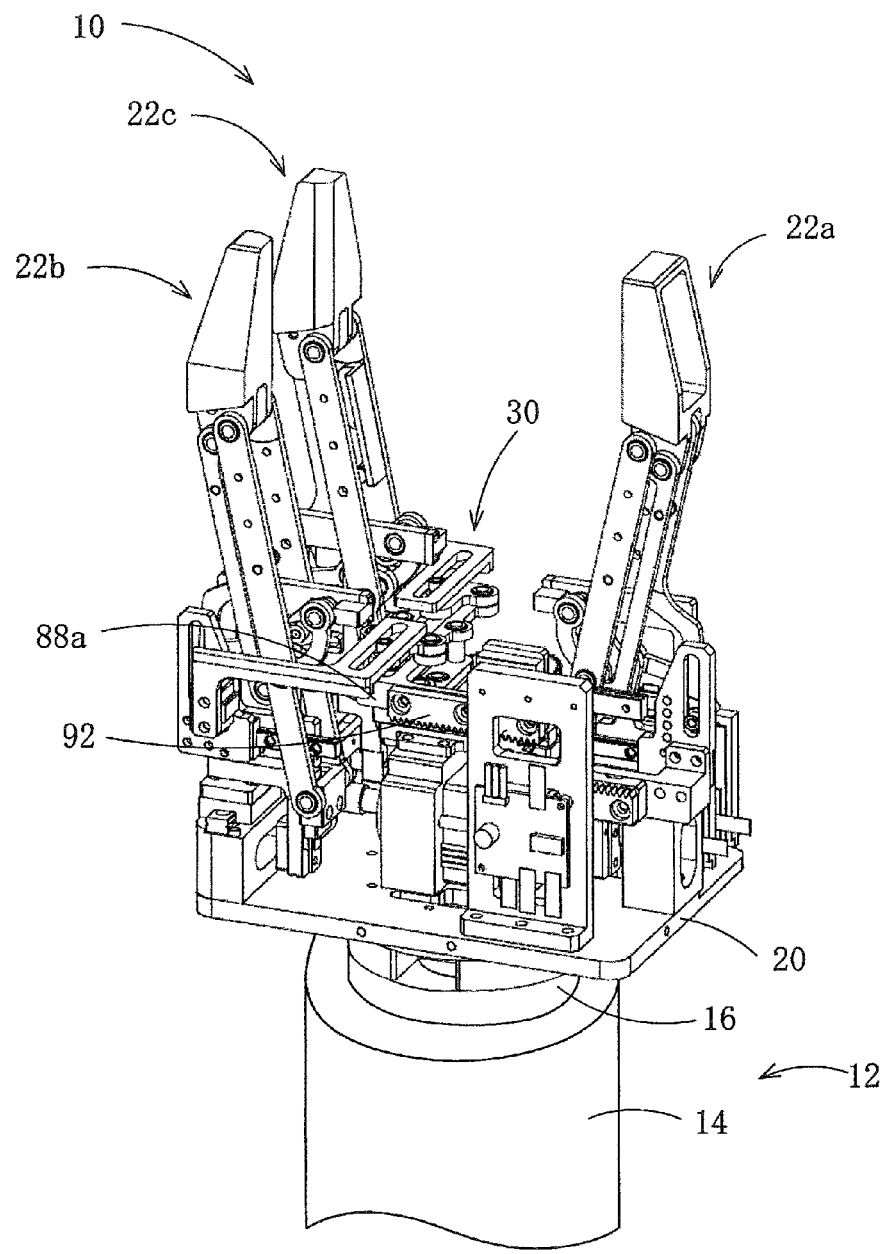
FIG. 1 is a perspective view illustrating a structure of a robot hand according to an embodiment of this disclosure.

As illustrating in FIG. 1, a robot hand 10 according to an embodiment is provided on, for example, a flange 16 of an arm 14 of a robot 12. The robot 12 is, for example, an industrial robot or a humanoid robot. Note that, although the direction of the robot hand 10 changes according to the orientation of the robot 12, description will be made assuming that the direction toward the distal end of the robot hand 10 is an upward direction.

Figure 2A:
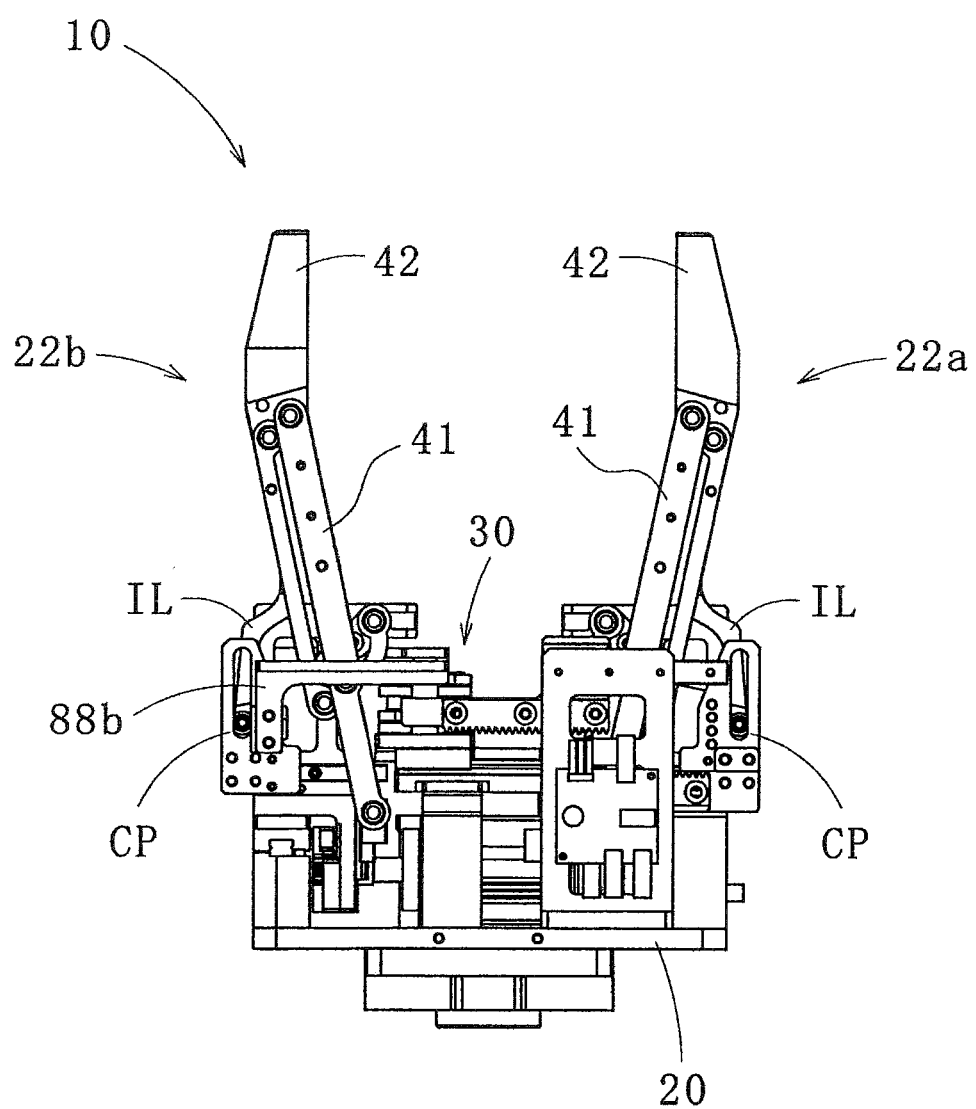
FIG. 2A is a front view illustrating a structure of a robot hand according to an embodiment of this disclosure.
Figure 2B:
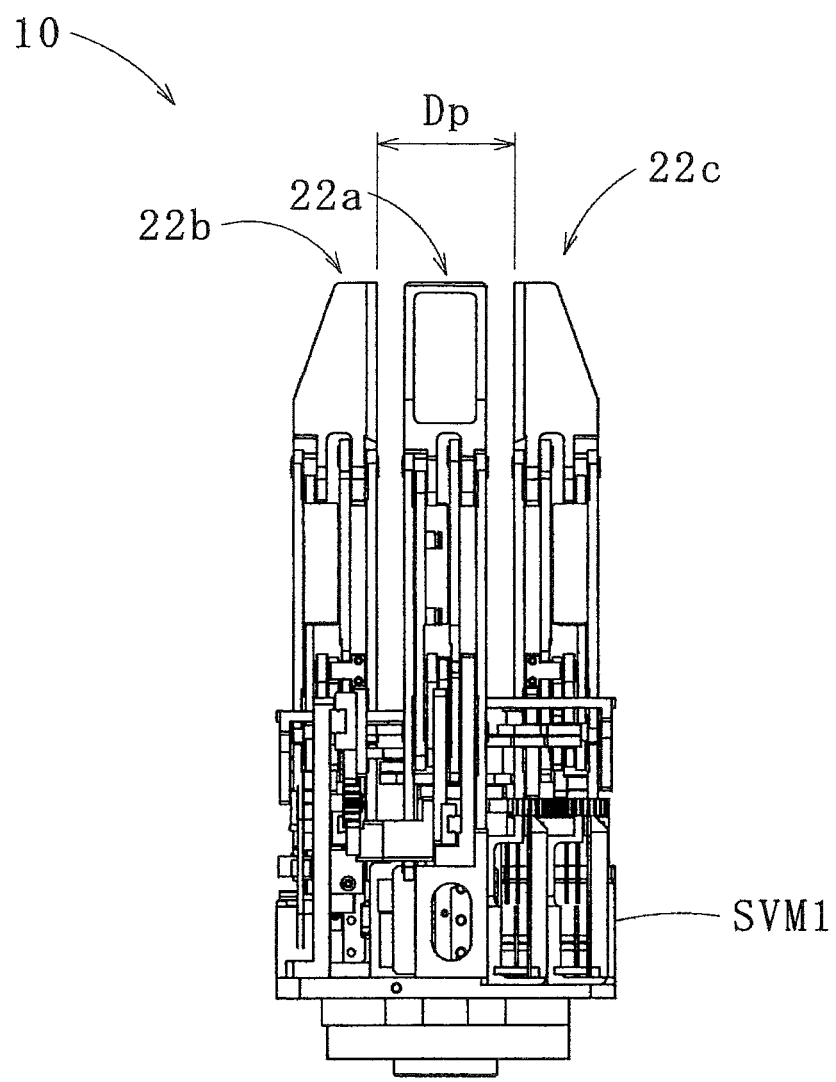
FIG. 2B is a side view illustrating a structure of a robot hand according to an embodiment of this disclosure.
Figure 2C:
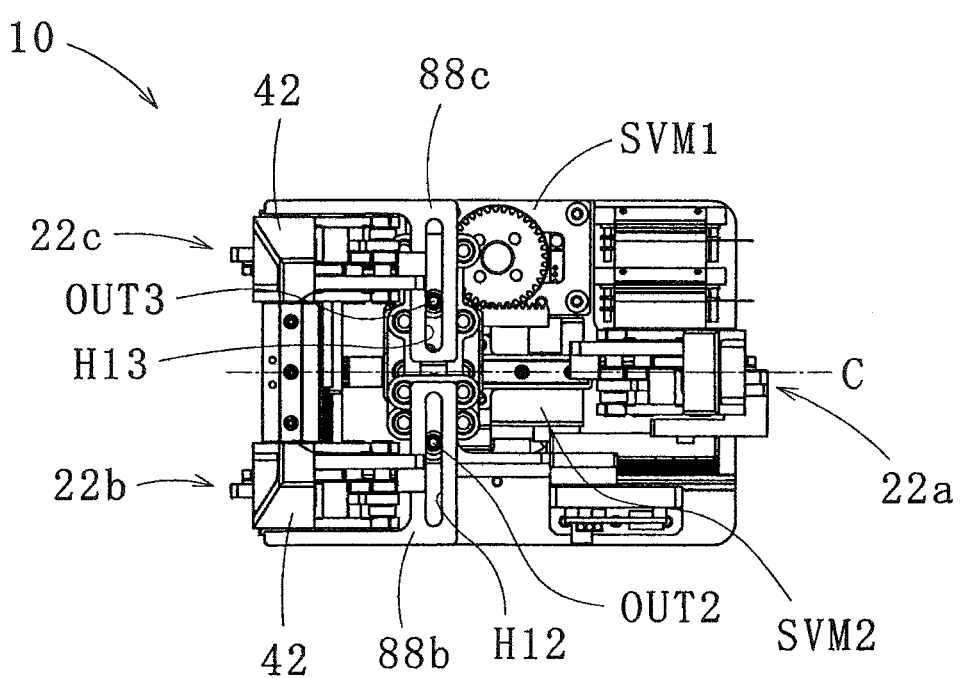
FIG. 2C is a plan view illustrating a structure of a robot hand according to an embodiment of this disclosure.

As illustrated in FIG. 2A to 2C, the robot hand 10 includes a frame 20, first to third finger units 22a, 22b, and 22c provided on the frame 20, a Roberval unit 30 (see FIG. 12 and FIG. 13) which drives each of the finger units 22a, 22b, and 22c, and a servo motor SVM1 (see FIG. 12) which is provided on the frame 20 and is a driving source of the Roberval unit 30.

Viewing the robot hand 10 in a plan view, that is, viewing the first to third finger units 22a, 22b, and 22c from the distal end side, the first finger unit 22a is arranged in one side with respect to the center portion of the frame 20 (see FIG. 2C) and the second and third finger units 22b and 22c are arranged in line in the other side with respect to the center portion of the frame 20 (see FIG. 2C). The second and third finger units 22b and 22c may be symmetrically arranged in the right side and the left side about the center line C which runs through the first finger unit 22a in a plan view.

Figure 3:
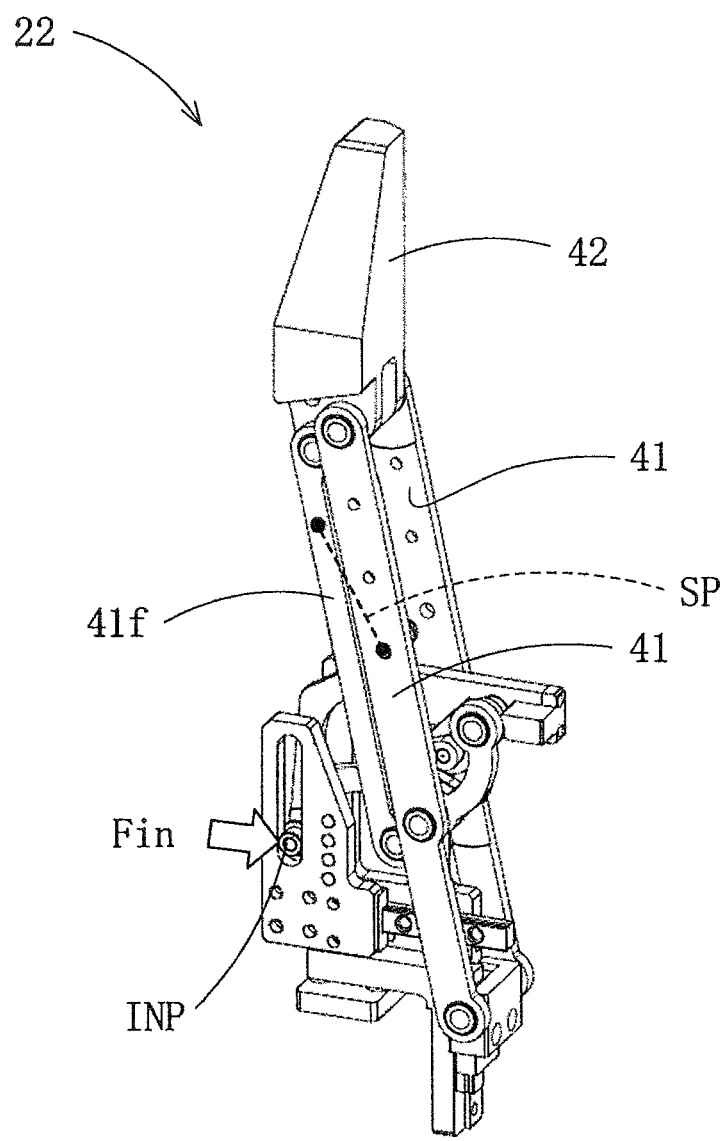
FIG. 3 is a perspective view of a finger unit included in the robot hand.

As illustrated in FIG. 2A, each of the finger units 22a, 22b, and 22c includes a conversion link member 41 which functions as a first grasping member allowed to make contact with the object to be grasped and a distal end portion link member 42 which is provided in the distal end side of the conversion link member 41 and functions as a second grasping member allowed to make contact with the object to be grasped. Each of the finger units 22a, 22b, and 22c has essentially the same configuration, though there may be difference such as having symmetric configuration. Therefore, the finger units 22a, 22b, and 22c may simply be described, without distinguishing, as a "finger unit 22". As illustrated in FIG. 3 and FIG. 4, the finger unit 22 is driven by a link mechanism which operates when a force Fin is applied to the input unit INP.

Figure 5A:
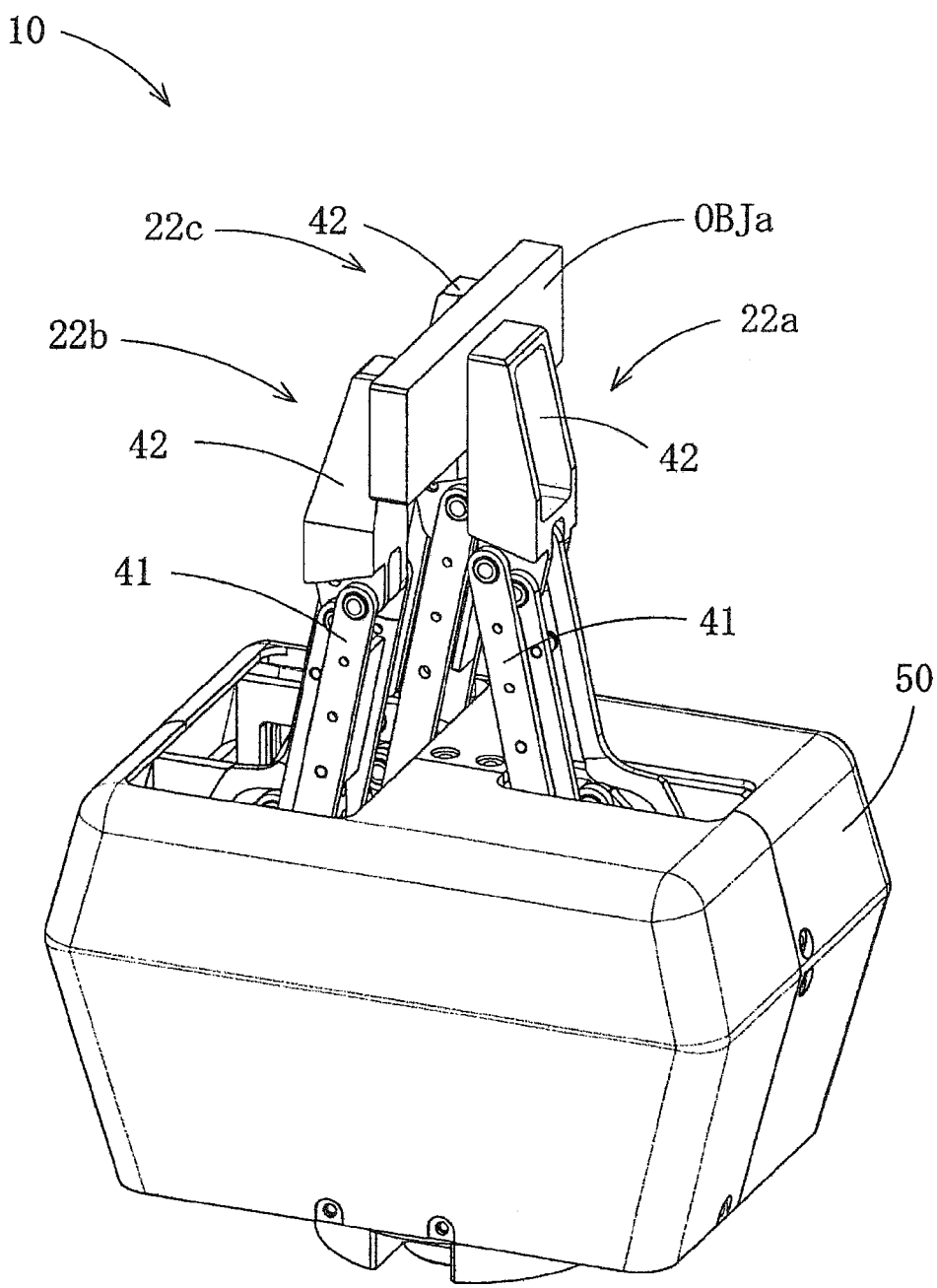
FIG. 5A is a perspective view of the robot hand grabbing an object to be grasped.
Figure 5B:
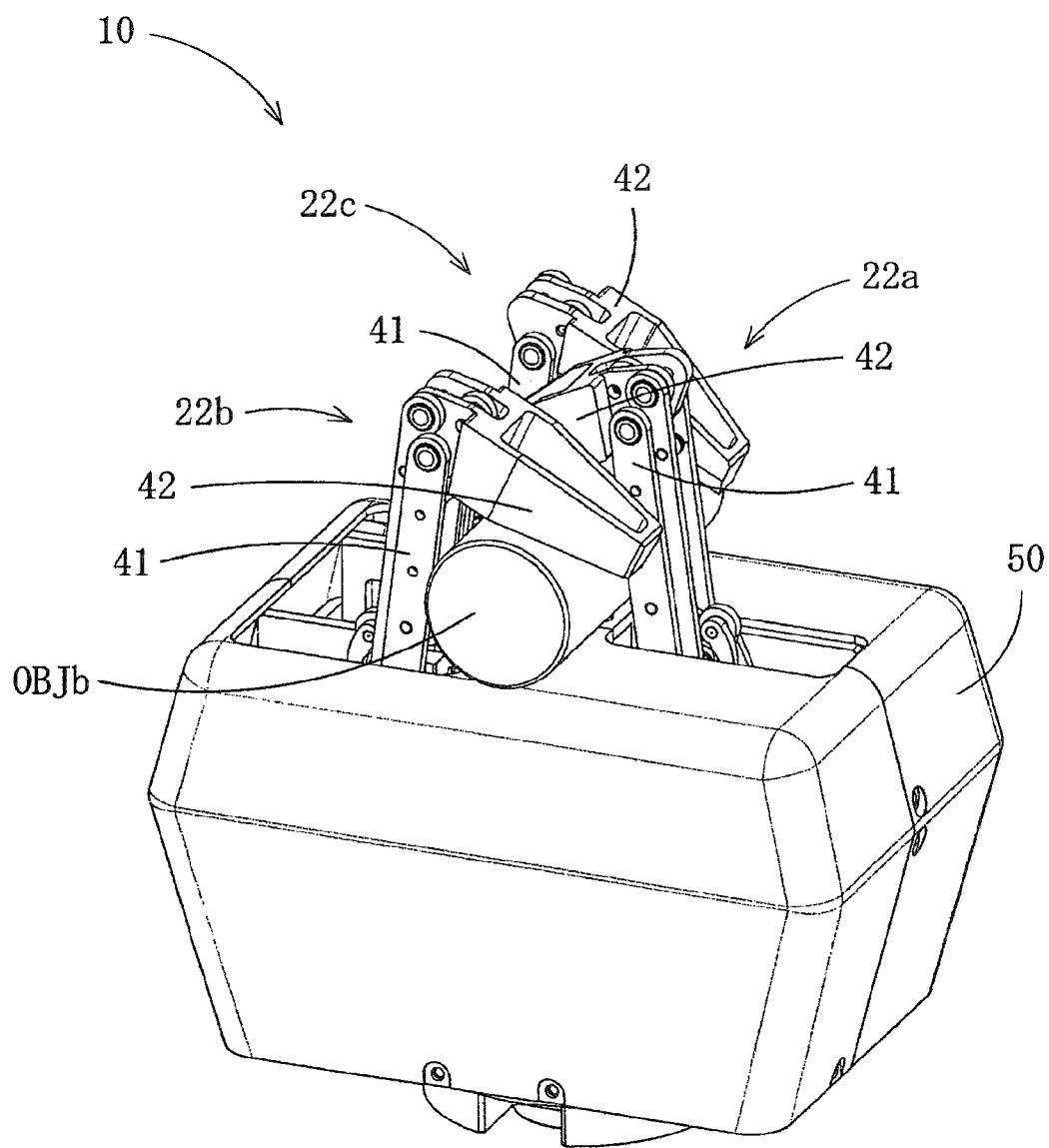
FIG. 5B is a perspective view of the robot hand gripping an object to be grasped.
Figure 6A:
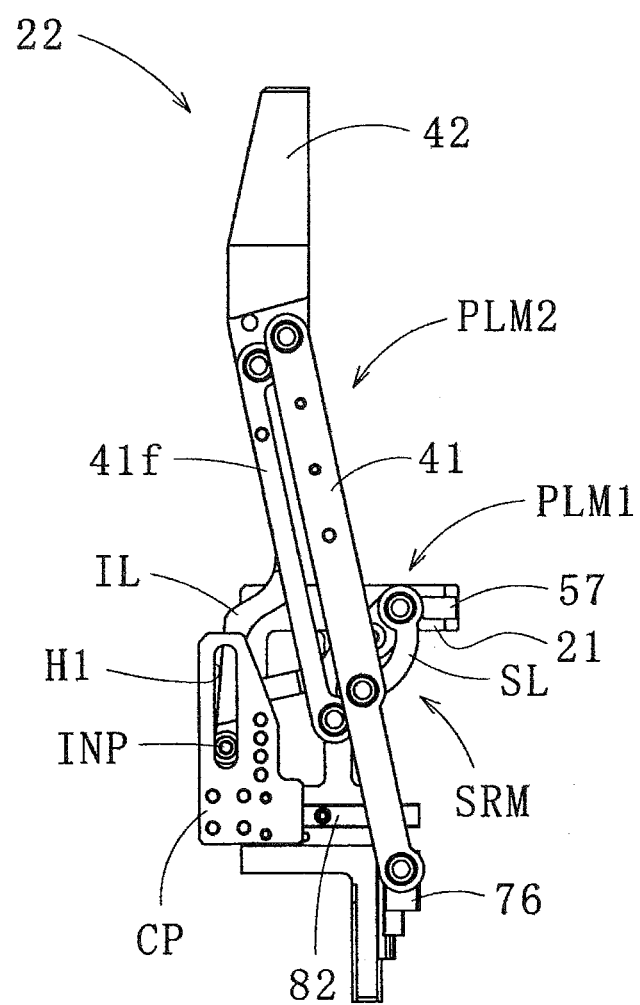
FIG. 6A is a front view illustrating a structure of a finger unit included in the robot hand.
Figure 6B:
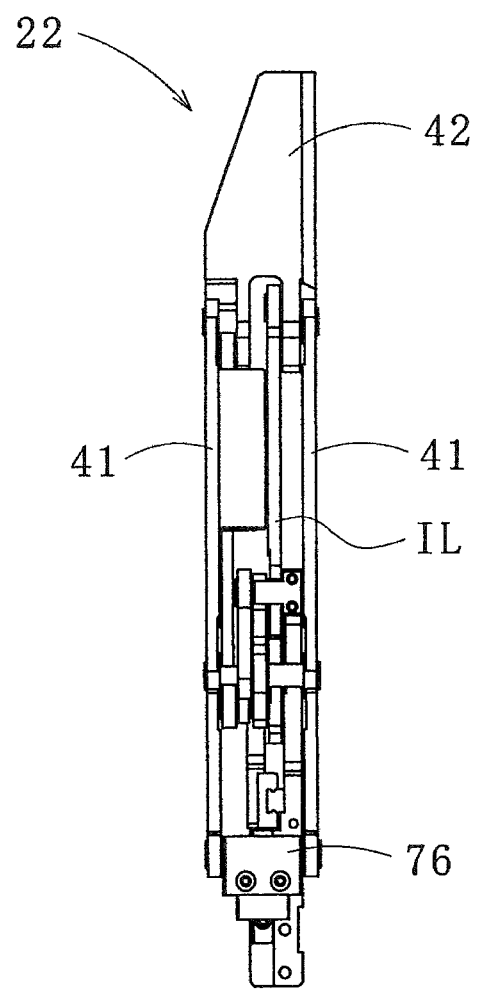
FIG. 6B is a side view illustrating a structure of a finger unit included in the robot hand.
Figure 6C:
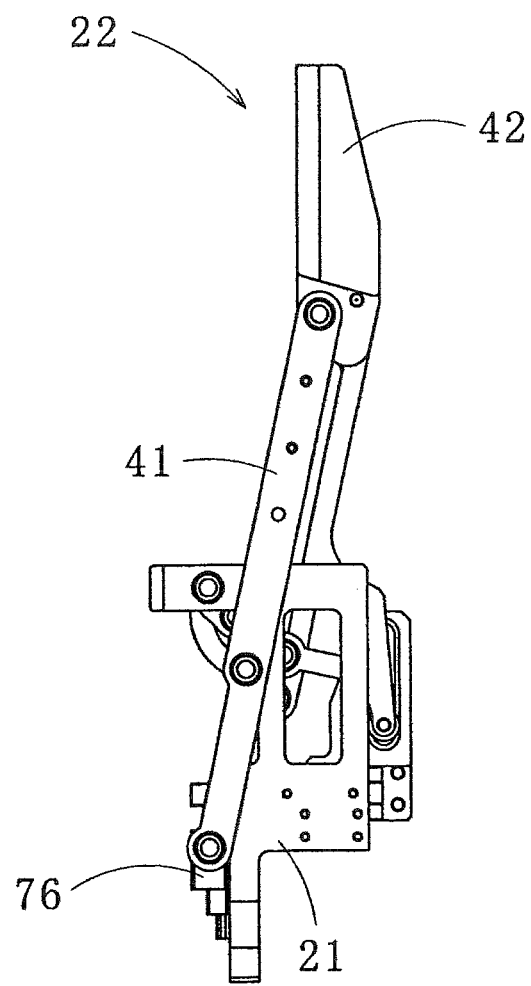
FIG. 6C is a rear view illustrating a structure of a finger unit included in the robot hand.
Figure 6D:
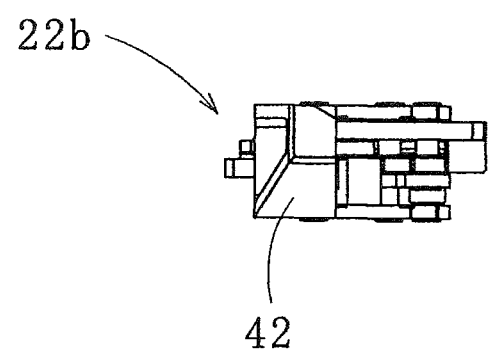
FIG. 6D is a plan view illustrating a structure of a finger unit included in the robot hand.

As illustrated in FIG. 4, when a force Fin is applied to the input unit INP, the robot hand 10 performs a closing operation (state A through C) to close the conversion link member 41 (first grasping unit) of the finger unit 22. Then, as illustrated in the dashed line in FIG. 4, the robot hand 10 operates under the condition in which the movement of a location P at the direction toward distal end of the distal end portion link member 42 (second grasping unit) is restricted, that is, the variation of the distance L from the surface including the attaching surface of the flange 16 provided on the distal end portion of the arm 14 of the robot 12 to the distal end of the distal end portion link member 42 is restricted. At the same time, the operation is carried out with the movement of the orientation of the distal end portion link member 42 also restricted. When a force Fin is further applied to the input unit INP during state C, the distal end portion link member 42 in the distal end side bends inward (state D). That is, by the closing operation carried out as in state A to C, the robot hand 10 can perform a grabbing operation to grasp the object to be grasped by using the distal end portion link member 42 (second grasping unit) in the distal end side. By this grabbing operation, for example, as illustrated in FIG. 5A, the robot hand 10 can grasp a rectangular solid shaped object OBJa which is to be grasped. Further, as in state D, a gripping operation can be performed, in which the distal end portion link member 42 tightly holds down the object to be grasped which is grasped by the conversion link member 41. By this gripping operation, for example, as illustrated in FIG. 5B, the robot hand 10 can grasp a column shaped object OBJb which is to be grasped.

As described above, the robot hand 10 is configured to perform, by a single servo motor SVM1, two types of grasping operation, that is, the grabbing operation and the gripping operation. Note that, as illustrated in FIGS. 5A and 5B, a cover 50 may be provided to the proximal end side portion of the finger unit 22.

As illustrated in FIG. 12, the Roberval unit 30 includes a first Roberval mechanism RM1 which moves together with a slider 52 and a second Roberval mechanism RM2 driven by the first Roberval mechanism RM1. The Roberval unit 30 divides the output of the servo motor SVM1 into total three outputs (first to third outputs). The first to third outputs of the Roberval unit 30 are inputs (driving power) for the first to third finger units 22a, 22b, and 22c, respectively. That is, the servo motor SVM1 is applied to the input unit INP of the finger unit 22 as the force Fin via the Roberval unit 30.

The servo motor SVM1 drives a slider 52 via a rack and pinion mechanism RP1 including a pinion gear 62 fixed to a motor shaft and a rack gear 64 which engages with the pinion gear 62. That is, when driving power is input from the servo motor SVM1, the first Roberval mechanism RM1 is driven together with the slider 52, thereby driving the second Roberval mechanism RM2 by the first Roberval mechanism RM1. As a result, each of the finger units 22a, 22b, and 22c is driven by the Roberval unit 30 so as to perform the grabbing operation or the gripping operation by the motion illustrated in FIG. 4. Note that, in FIG. 12, an operation of the Roberval unit 30 performed to close the finger unit 22 is illustrated. By counter-rotating the servo motor SVM1, directions of the input and the first to third outputs illustrated in FIG. 12 are reversed, thereby carrying out an operation to open the finger unit 22.

(Finger Unit)

Figure 7A:
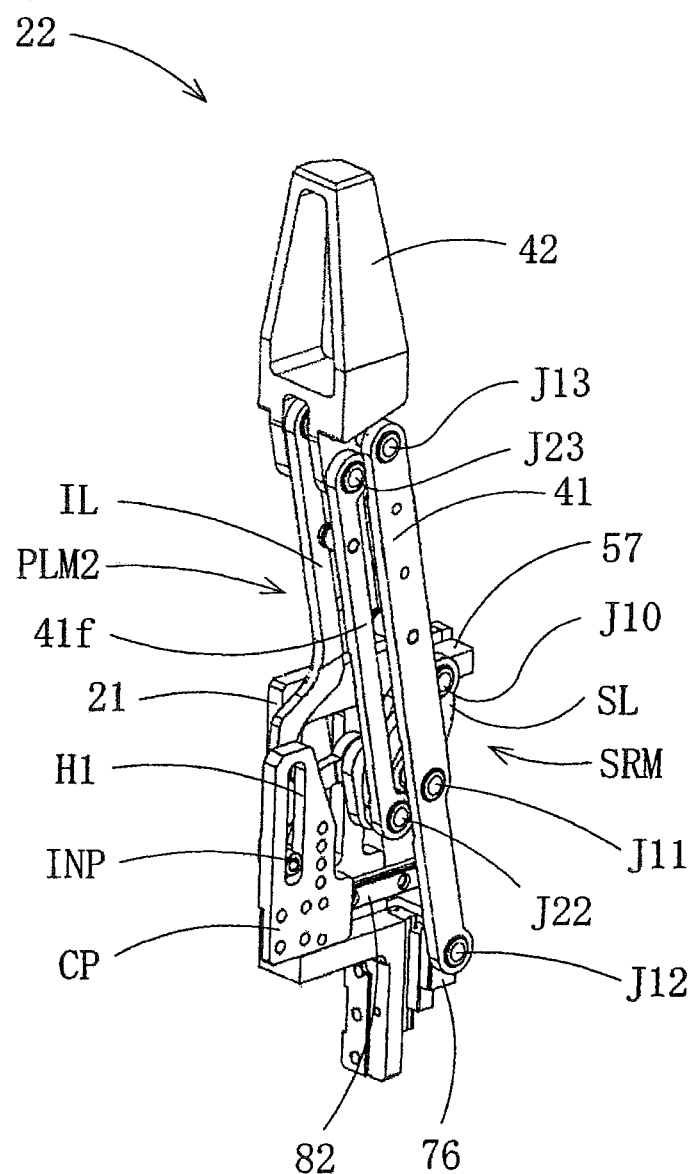
FIG. 7A is a perspective view of a finger unit included in the robot hand viewed from the front side.
Figure 7B:
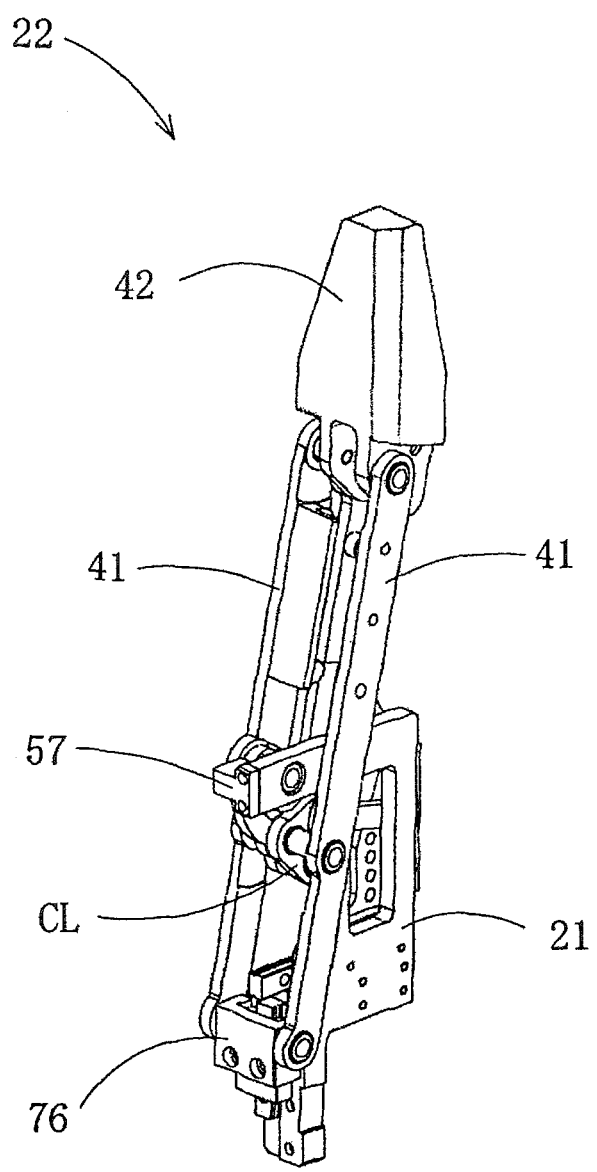
FIG. 7B is a perspective view of a finger unit included in the robot hand viewed from the rear side.

Now, the finger unit 22 (each of the finger units 22a, 22b, and 22c) will be described in detail. Each finger unit 22 illustrated in FIGS. 6A to 6D and FIGS. 7A to 7D includes a Scott Russell mechanism SRM, a first parallel link mechanism PLM1, a second parallel link mechanism PLM2, and an input link member IL, as illustrated in FIG. 8.

Figure 7C:
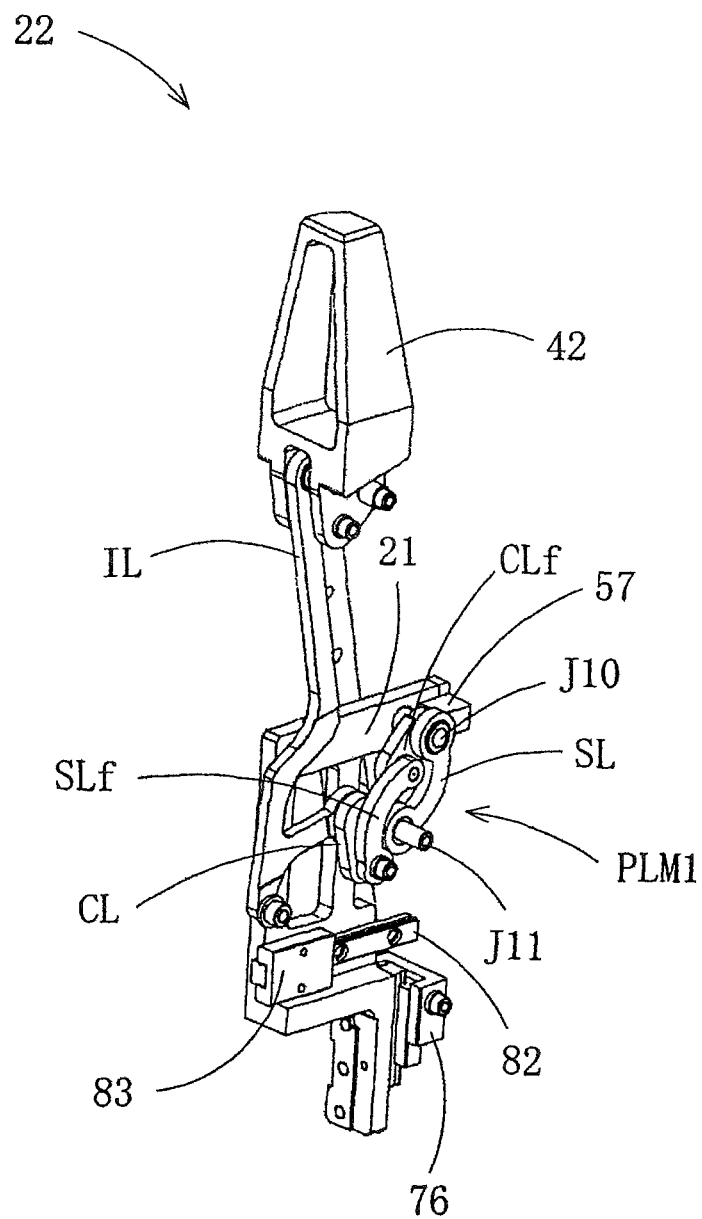
FIG. 7C is a perspective view of a finger unit, from which some of links are removed, included in the robot hand viewed from the front side.
Figure 7D:
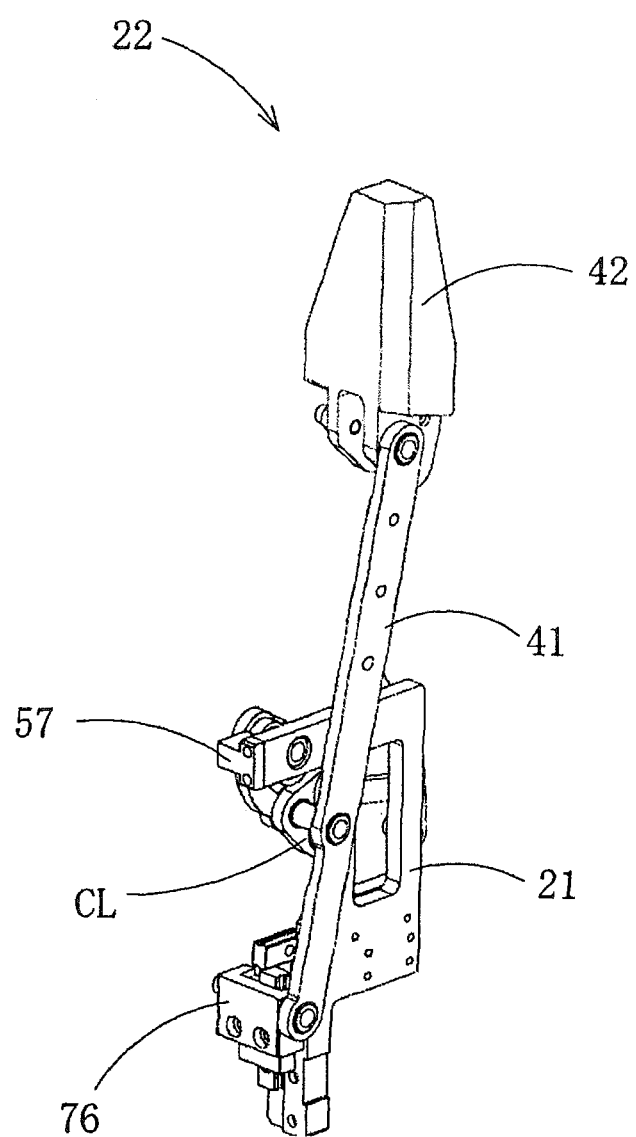
FIG. 7D is a perspective view of a finger unit, from which some of links are removed, included in the robot hand viewed from the rear side.
Figure 8:
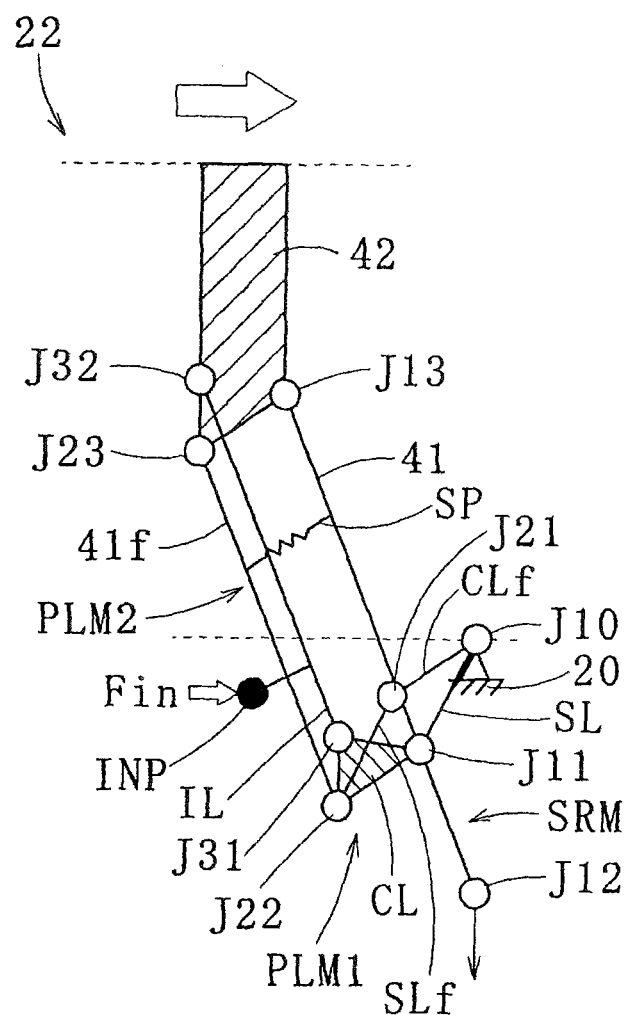
FIG. 8 is a schematic diagram of an operation mechanism of a finger unit included in the robot hand.
Figure 9A:
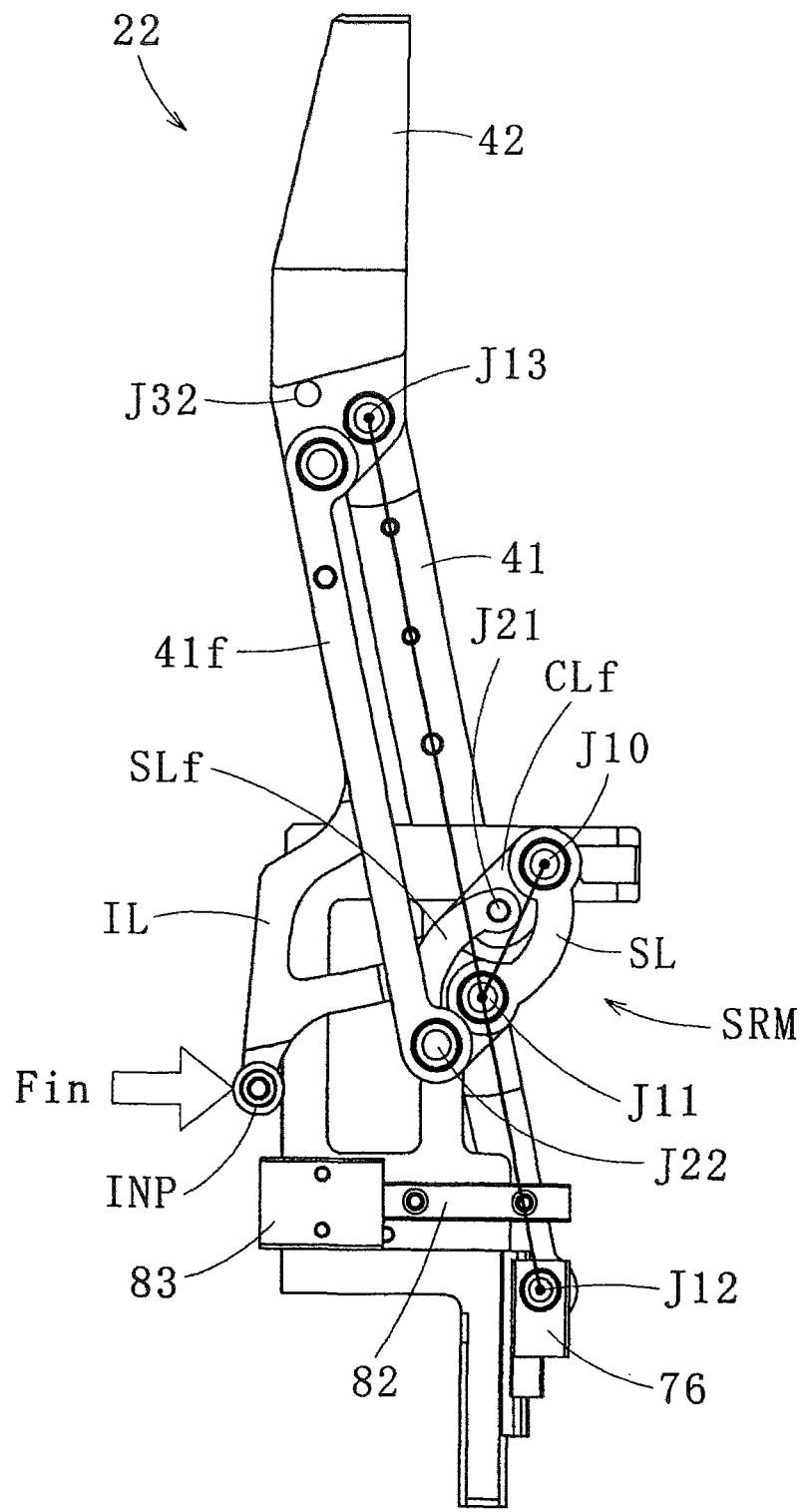
FIG. 9A is an explanatory drawing illustrating a Scott Russell mechanism which a finger unit of the robot hand includes.
Figure 10:
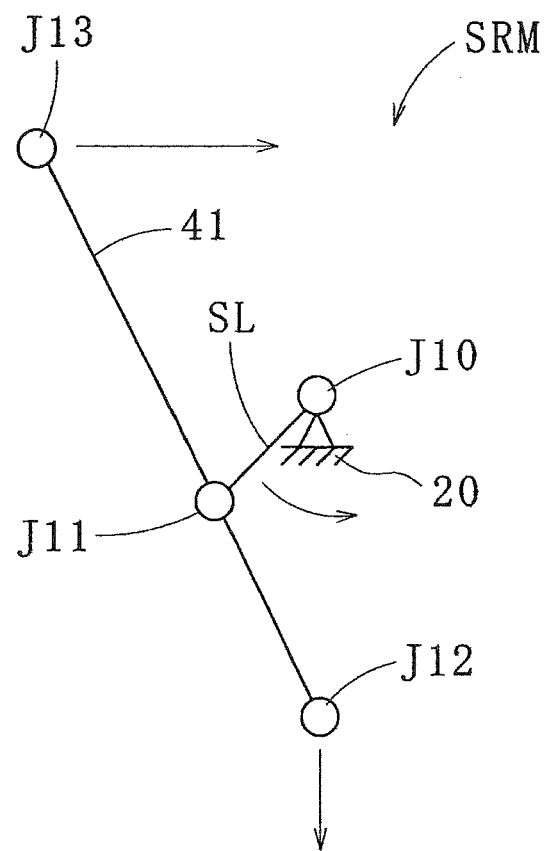
FIG. 10 is a schematic diagram of a Scott Russell mechanism which a finger unit of the robot hand includes.

As illustrated in FIGS. 7C, 9A, and 10, the Scott Russell mechanism SRM is configured with at least a swing lever member SL and the conversion link member 41. One of the end portions of the swing lever member SL is pivotally connected to the finger frame 21 at a connecting portion J10. Note that, since an adjusting unit which will be described below allows the finger frame 21 to makes translational motion to the frame 20 without rotational motion, it can be considered that the end portion of the swing lever member SL is pivotally connected not only to the finger frame 21 but also to the frame 20, at the connecting portion J10.

The conversion link member 41 (first grasping unit) is pivotally connected to the other end portion of the swing lever member SL at a connecting portion J11 located in the middle portion of the conversion link member 41. One of the end portions of the conversion link member 41 is pivotally connected, at a connecting portion 112, to a slider 76 (see FIGS. 6A to 6C) which is movable in the up-and-down direction. Therefore, a connecting portion J13 located at the other end portion of the conversion link member 41 moves in the direction intersecting with the moving direction of the connecting portion 112 located at the end portion. That is, the up-and-down movement of the connecting portion J12 located at the end portion of the conversion link member 41 allows the connecting portion J13 located at the other end portion to move in the direction which opens or closes the conversion link member 41 (first grasping unit). In this process, as illustrated in state A through C in FIG. 4, by the function of the Scott Russell mechanism, the connecting portion J13 located at the other end moves under the condition in which the movement of the location at the direction toward the distal end of the distal end portion link member 42 (second grasping unit), that is, the variation of the distance from the surface including the attaching surface of the flange 16 of the arm 14 of the robot 12 to the other end portion, and the movement of orientation are restricted. Note that, as illustrated in FIG. 7B, the conversion link member 41 is provided to the front side and the rear side so as to support the distal end portion link member 42 from both sides.

Figure 11A:
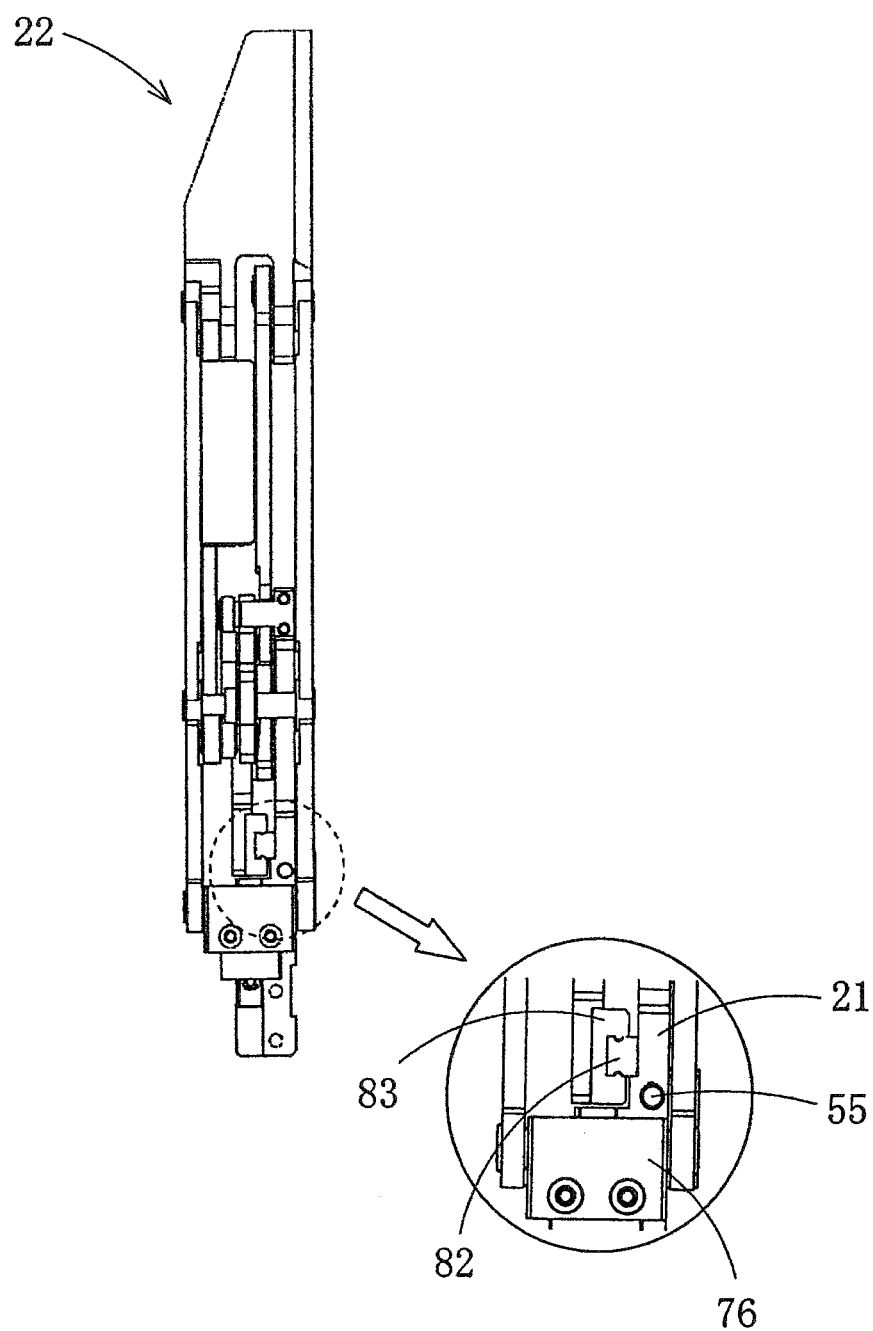
FIG. 11A is an explanatory drawing of a first stopper provided in a finger unit included in the robot hand.

In the Scott Russell mechanism SRM, a first stopper 55 (see FIG. 11A) which protrudes from the finger frame 21 to the side on which the slider 76 passes is provided so as to be able to make contact with the upper side surface of the slider 76. Therefore, the upward movement of the slider 76 is restricted by the first stopper 55. That is, when there is no object to be grasped and the finger unit 22 closes to be at a predetermined position (state C in FIG. 4), the movement of the conversion link member 41 connected to the slider 76 at the connecting portion J12 is restricted.

Figure 9B:
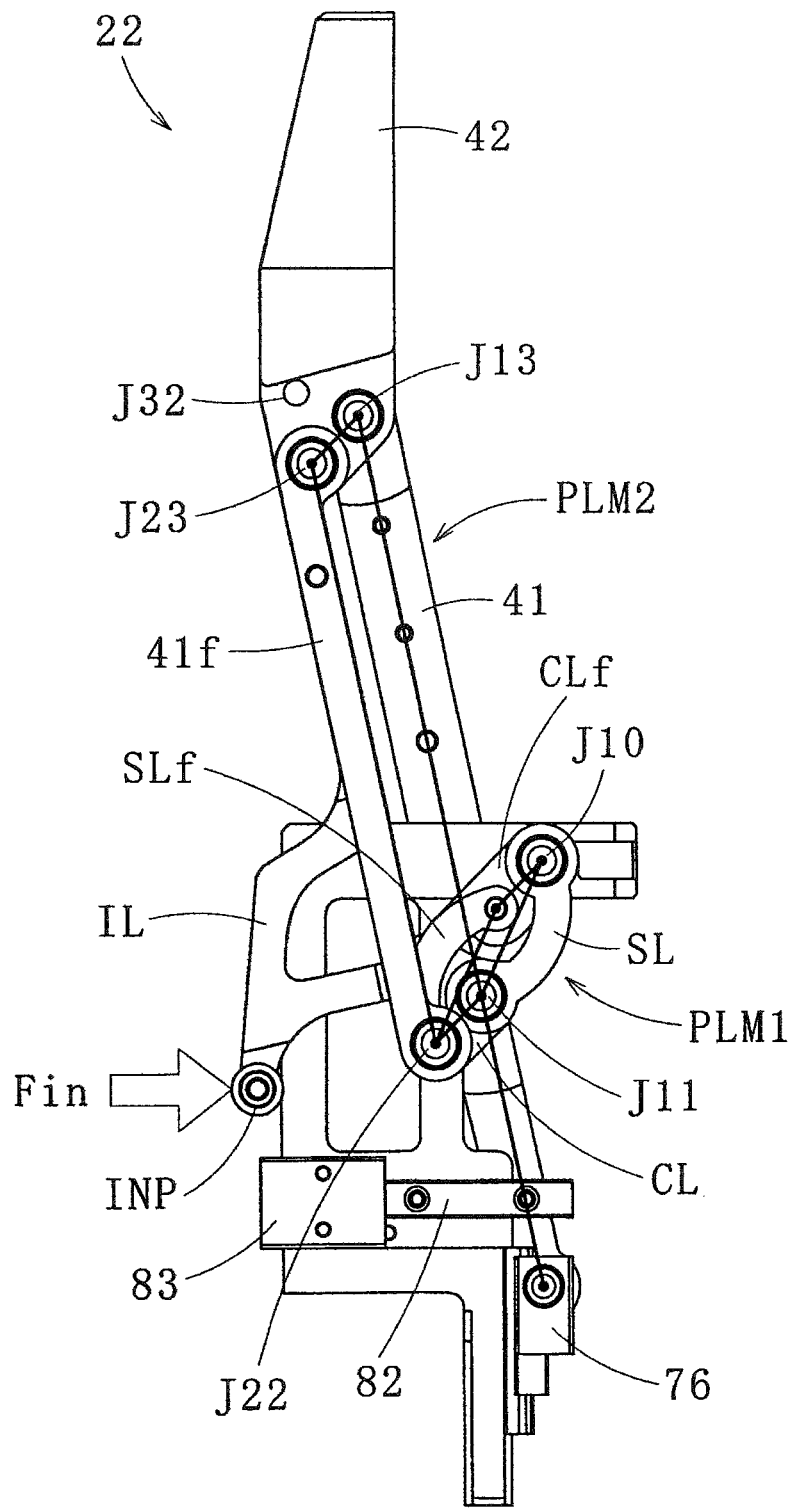
FIG. 9B is an explanatory drawing illustrating first and second parallel link mechanisms which a finger unit of the robot hand includes.

As illustrated in FIG. 9B, the first parallel link mechanism PLM1 includes the swing lever member SL of the Scott Russell mechanism SRM, a common link member CL, a facing swing lever member SLf arranged in a position so as to face the swing lever member SL, and a facing common link member CLf.

As illustrated in FIGS. 7B to 7D and 8, the common link member CL is, for example, a triangle shaped plate member. The common link member CL is pivotally connected to the connecting portion J11.

One of the end portions of the facing swing lever member SLf is pivotally connected to the common link member CL at a connecting portion J22, and the other end is pivotally connected to the facing common link member CLf at a connecting portion J21.

Figure 11B:
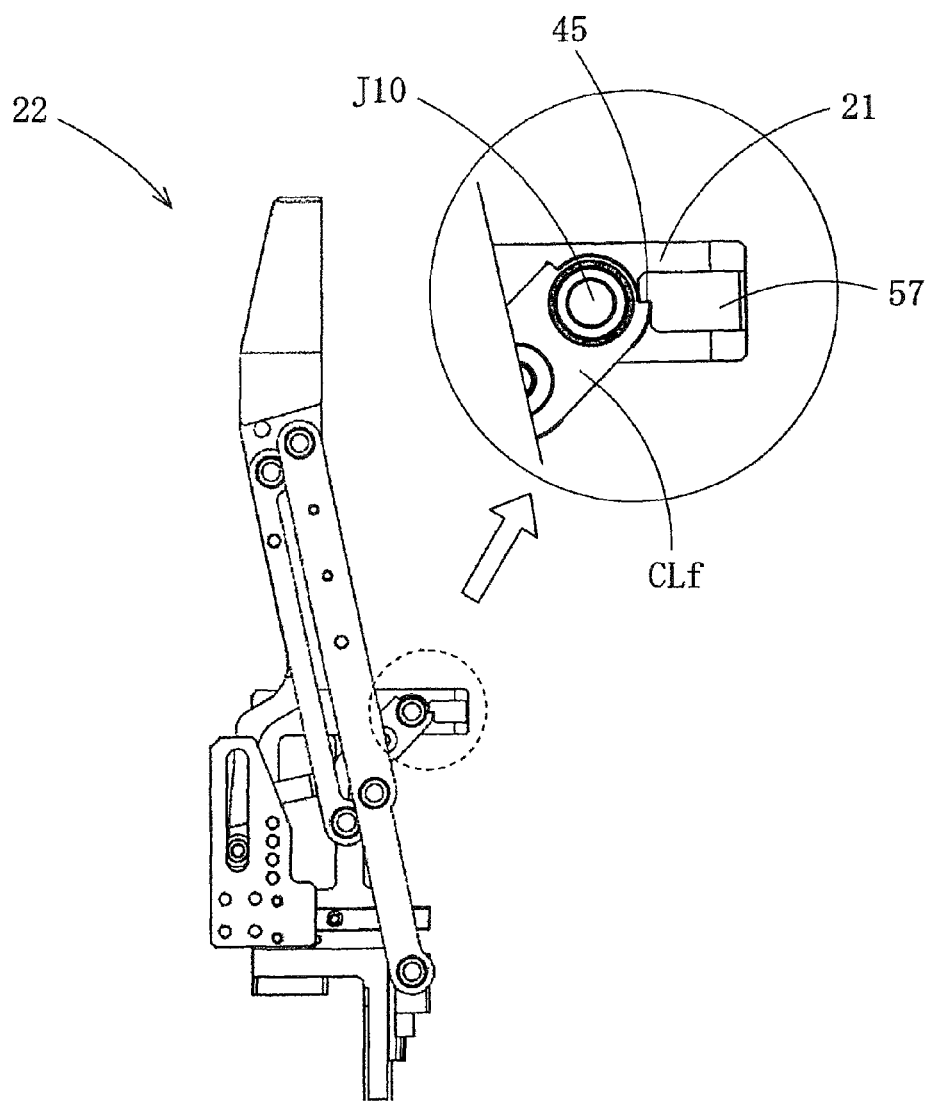
FIG. 11B is an explanatory drawing of a second stopper provided in a finger unit included in the robot hand.

One of the end portions of the facing common link member CLf is pivotally connected to the swing lever member SL at a connecting portion J10, and the other end is pivotally connected to the other end portion of the facing swing lever member SLf at the connecting portion J21. A notch 45 is provided on the end portion of the connecting portion J10 of the facing common link member CLf as illustrated in FIG. 11B. By the notch 45 abutting against a second stopper 57 fixed on the finger frame 21, the rotation of the facing common link member CLf about the connecting portion J10 is restricted within a predetermined range.

Each link of the first parallel link mechanism PLM1 is arranged to have an angle so as that the first parallel link mechanism PLM1 does not pass the dead point during the process (state A through D in FIG. 4) in which the finger unit 22 grabs or grips the object to be grasped. However, each link can also be set to have an angle so as that the first parallel link mechanism PLM1 passes the dead point. In this case, a link for avoiding a dead point may be added to prevent the operation from being unstable even when the first parallel link mechanism PLM1 passes the dead point.

As illustrated in FIG. 9B, the second parallel link mechanism PLM2 includes the common link member CL, the conversion link member 41, the distal end portion link member 42 arranged in a position so as to face the common link member CL, and a facing conversion link member 41f arranged in a position so as to face the conversion link member 41.

The distal end portion link member 42 (second grasping unit) is pivotally connected to the other end portion (end portion in the distal end side) of the conversion link member 41 and to the other end portion (end portion in the distal end side) of the facing conversion link member 41f at connecting portions J13 and J23, respectively. As illustrated in state D in FIG. 4 and FIG. 5B, the distal end portion link member 42 bends inward from the proximal portion of the distal end portion link member 42 so as to make contact with, and grip, the object to be grasped.

The facing conversion link member 41f is pivotally connected to the common link member CL and to the distal end portion link member 42 at connecting portions J22 and J23, respectively.

As illustrated in FIGS. 3 and 4, the second parallel link mechanism PLM2 is provided with a tension spring SP. The tension spring SP is, for example, a coil spring. One of the end portions of the tension spring SP is fixed to the conversion link member 41 and the other end portion is fixed to the facing conversion link member 41f. The longitudinal direction of the tension spring SP intersects with the direction in which the conversion link member 41 extends. The tension spring SP produces tension force between the conversion link member 41 and the facing conversion link member 41f so as the notch 45 of the facing common link member CLf to abut against the second stopper 57 until the object to be grasped is grasped or the slider 76 makes contact with the first stopper 55 (see FIG. 11B).

Each link of the second parallel link mechanism PLM2 is arranged to have an angle so as that the second parallel link mechanism PLM2 does not pass the dead point during the process in which the finger unit 22 grasps the object to be grasped. However, each link can be set to have an angle so as that the second parallel link mechanism PLM2 passes the dead point. In this case, a link for avoiding the dead point may be added to prevent the operation from being unstable even when the second parallel link mechanism PLM2 passes the dead point.

The input link member IL pivotally connects the common link member CL and the distal end portion link member 42. The distal end portion of the input link member IL is connected to the distal end portion link member 42 at a connecting portion J32 which is located further toward the distal end side than the connecting portion J23 of the distal end portion of the facing conversion link member 41f when the finger unit 22 is opened as illustrated in FIG. 9B, viewing from the front side of the finger unit 22. Further, as illustrated in FIG. 8, the proximal end portion of the input link member IL is connected to the common link member CL at a connecting portion J31 which is located in the inner side of the parallelogram (a parallelogram formed by the connecting portions J11, J22, J23, and J13) formed by each of the link members 41, 41f, CL, and 42 of the second parallel link mechanism PLM2 when the finger unit 22 is opened, viewing from the front side of the finger unit 22. Further, a line segment connecting the connecting portion J31 and the connecting portion J32 of the input link member IL extends parallel to the conversion link member 41 (a line segment connecting the connecting portion J11 and the connecting portion J13). Note that, the term "parallel" does not mean strictly parallel. That is, the term "parallel" means "essentially parallel" in which tolerances of design and manufacturing are allowed (the same applies hereinafter).

A force Fin which makes the conversion link member 41 (first grasping unit) to grasp the object to be grasped and the distal end portion link member 42 (second grasping unit) to grip the object to be grasped is applied, in one direction, to the input link member IL. The force is applied to the input unit INP provided on the input link member IL (see FIG. 4).

Specifically, the input link member IL is driven by a cam plate CP (see FIGS. 6A and 7A) provided in the finger unit 22. The cam plate CP is provided on a slider 83 which moves along the guide 82 illustrated in FIG. 7C. The cam plate CP moves along the direction corresponding to opening and closing of the finger unit 22 (the direction intersecting with the moving direction of the connecting portion J12 located at one of the end portions of the conversion link member 41). Further, as illustrated in FIG. 7A, a long hole H1 of which longitudinal direction is in the up-and-down direction is formed on the cam plate CP. The input unit INP engages in the long hole H1.

Note that, the force for driving the finger unit 22 may be applied to any of the links constituting the Scott Russell mechanism SRM, the first parallel link mechanism PLM1, and the second parallel link mechanism PLM2, instead of applying to the input unit INP of the input link member IL. The force may be applied to the input link member IL, since in this manner, the finger unit 22 operates by continuously applying the force in one direction.

From another view point of the finger unit 22, it can be considered that the finger unit 22 includes the third parallel link mechanism configured with at least the conversion link member 41 and the input link member IL arranged in a position so as to face the conversion link member, instead of including the second parallel link mechanism PLM2. In this case, the third parallel link mechanism passes the dead point during the process of the finger unit 22 gripping the object to be grasped. The facing conversion link member 41f constituting a part of the second parallel link mechanism PLM2 may be considered as a dead point avoiding link for stably continuing the operation after the third parallel link mechanism reaching the dead point.

(Roberval Unit)

Now the Roberval unit 30 will be described in detail. As described above, the Roberval unit 30 includes the first Roberval mechanism RM1 and the second Roberval mechanism RM2 (see FIG. 12).

Figure 14A:
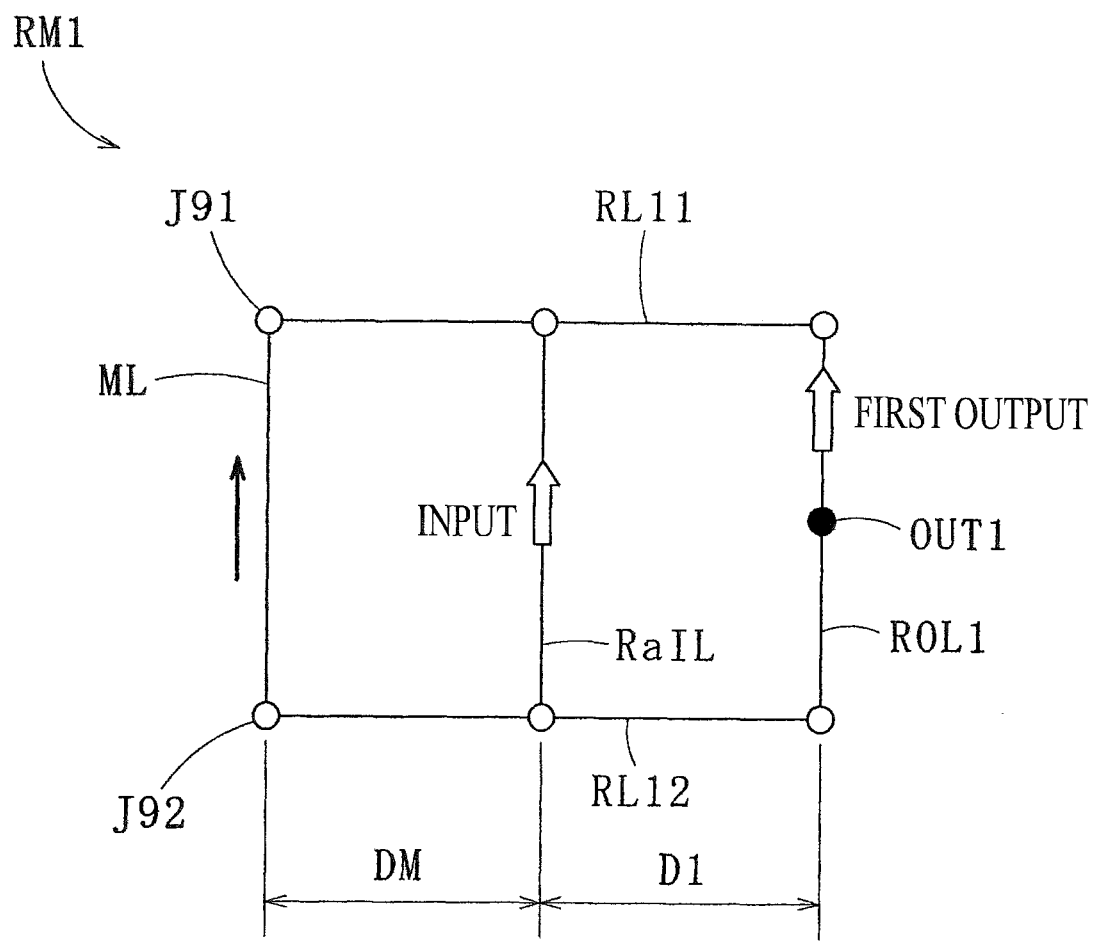
FIG. 14A is a schematic diagram of a first Roberval mechanism included in the robot hand, in a plan view.
Figure 14B:
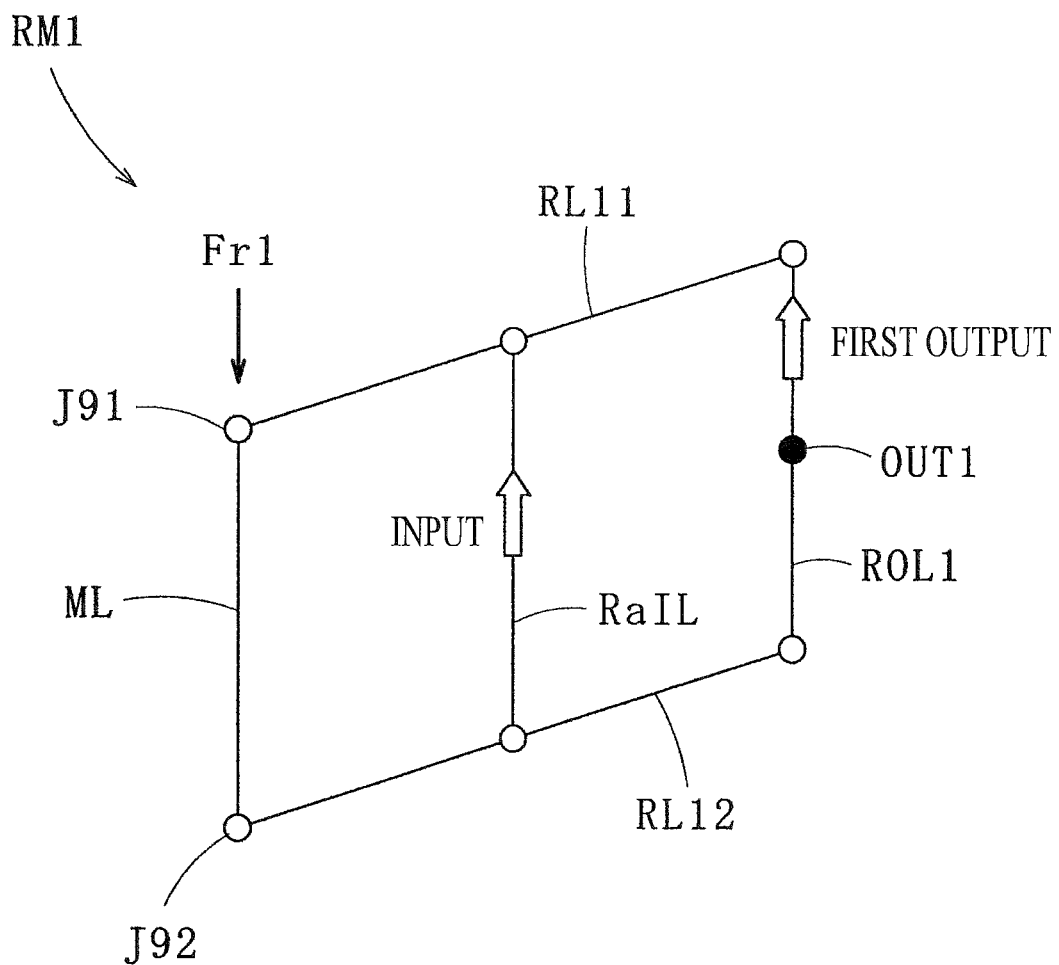
FIG. 14B is an explanatory drawing illustrating an operation of the first Roberval mechanism included in the robot hand, in a plan view.

The first Roberval mechanism RM1 divides the driving power of the servo motor SVM1 into an intermediate output and a first output for driving the first finger unit 22a. For example, as illustrated in FIG. 14A, the first Roberval mechanism RM1 includes an input link RaIL to which the driving power of the servo motor SVM1 is input, a first output link ROL1 which outputs a portion of the driving power of the servo motor SVM1 that has been input, and an intermediate output link ML which outputs the remaining driving power of the servo motor SVM1 that has been input. FIGS. 14A and 14B are schematic diagrams illustrating the first Roberval mechanism RM1 viewed from above.

The input link RaIL is arranged to be parallel to the moving direction of the cam plate CP, along the center line C, as illustrated in FIG. 2C. In FIG. 12, the slider 52 functions as the input link RaIL to which the driving power of the servo motor SVM1 is input via the rack and pinion mechanism RP1. As illustrated in FIG. 14A, one of the end portions of the input link RaIL is pivotally connected to the middle portion of a link RL11 extending in the direction intersecting with the moving direction of the cam plate CP, in a plan view. The other end portion of the input link RaIL is pivotally connected to the middle portion of a link RL12 extending in the direction, intersecting with the moving direction of the cam plate CP in a plan view, and parallel to the link RL11.

Figure 13:
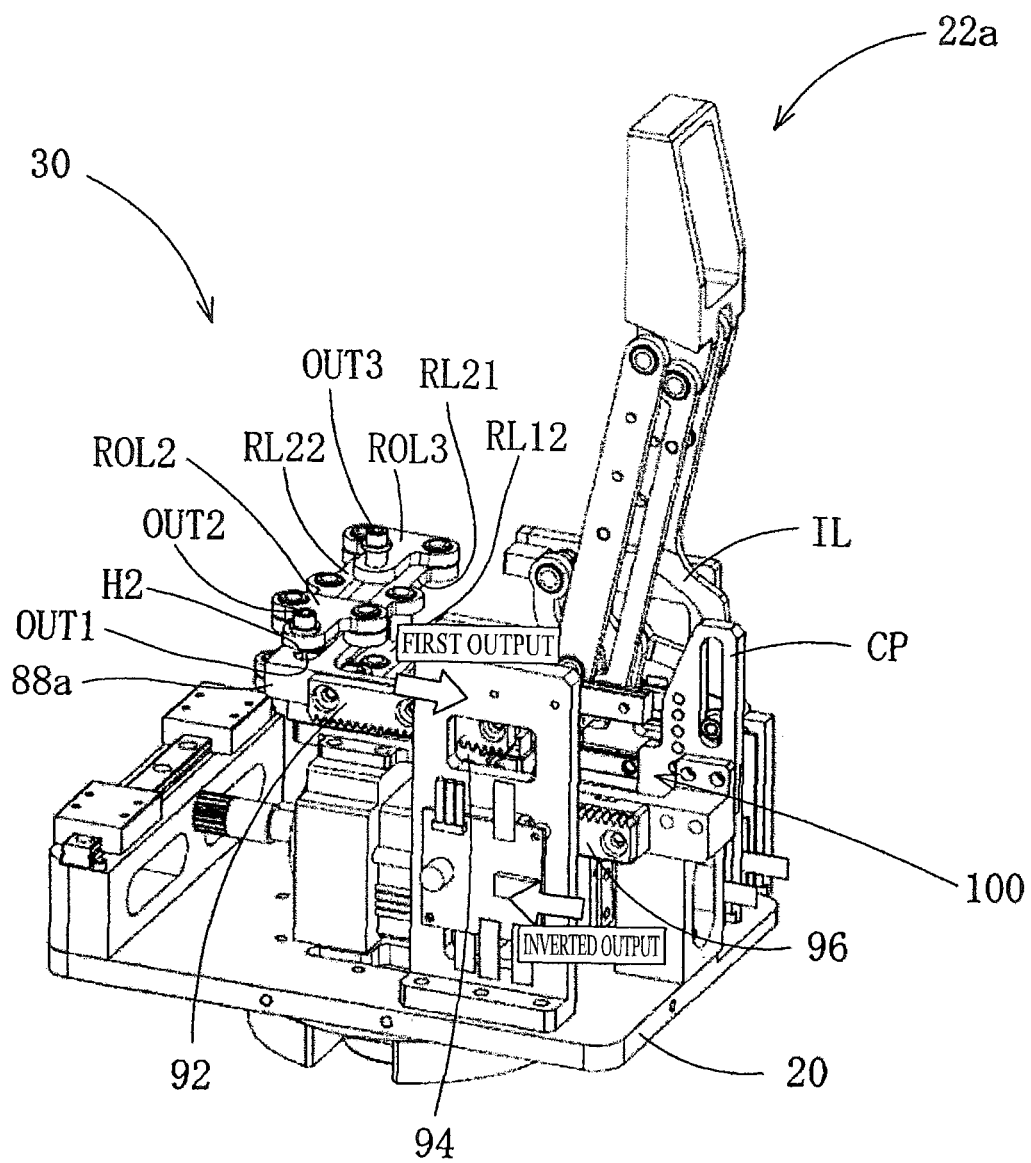
FIG. 13 is a perspective view of a Roberval unit and a finger unit included in the robot hand.

The first output link ROL1 has the same length as the input link RaIL and is arranged to be parallel to the moving direction of the cam plate CP. One of the end portions of the first output link ROL1 is pivotally connected to the link RL11, and the other end portion is pivotally connected to the link RL12. As illustrated in FIG. 13, the output unit OUT1 of the first output link ROL1 engages in a long hole H2 formed on a connecting member 88a. A rack gear 92 is provided on the side surface of the connecting member 88a and engages with a pinion gear 94 of which rotational axis is fixed to the frame 20. The pinion gear 94 further engages with a rack gear 96. Therefore, the first output link ROL1 drives the cam plate CP in the direction opposite to the moving direction of the output unit OUT1 of the first output link ROL1 via an inverse unit 100 including the connecting member 88a and the rack and pinion mechanism. In other words, the first output is inverted by the inverse unit 100 to be an inverted output (see the arrow illustrated in FIG. 13) having the opposite direction. The cam plate CP is driven by this inverted output.

The intermediate output link ML has the same length as the input link RaIL and is arranged to be parallel to the moving direction of the cam plate CP. One of the end portions of the intermediate output link ML is pivotally connected to the link RL11, and the other end portion is pivotally connected to the link RL12. However, as illustrated in FIG. 12, the intermediate output link ML may be omitted. In this case, it can be considered that an end portion J91 of the link RL11 in the opposite side of the first output link ROL1 and an end portion J92 of the link RL12 in the opposite side of the first output link ROL1 output the intermediate output.

The first Roberval mechanism RM1 allows the input link RaIL and the first output link ROL1 to continue moving when the driving power of the servo motor SVM1 is input to the input link RaIL, even when, for example, a force Fr1 which hinders the movement of the intermediate output link ML is applied to the intermediate output link ML as illustrated in FIG. 14B.

Figure 15A:
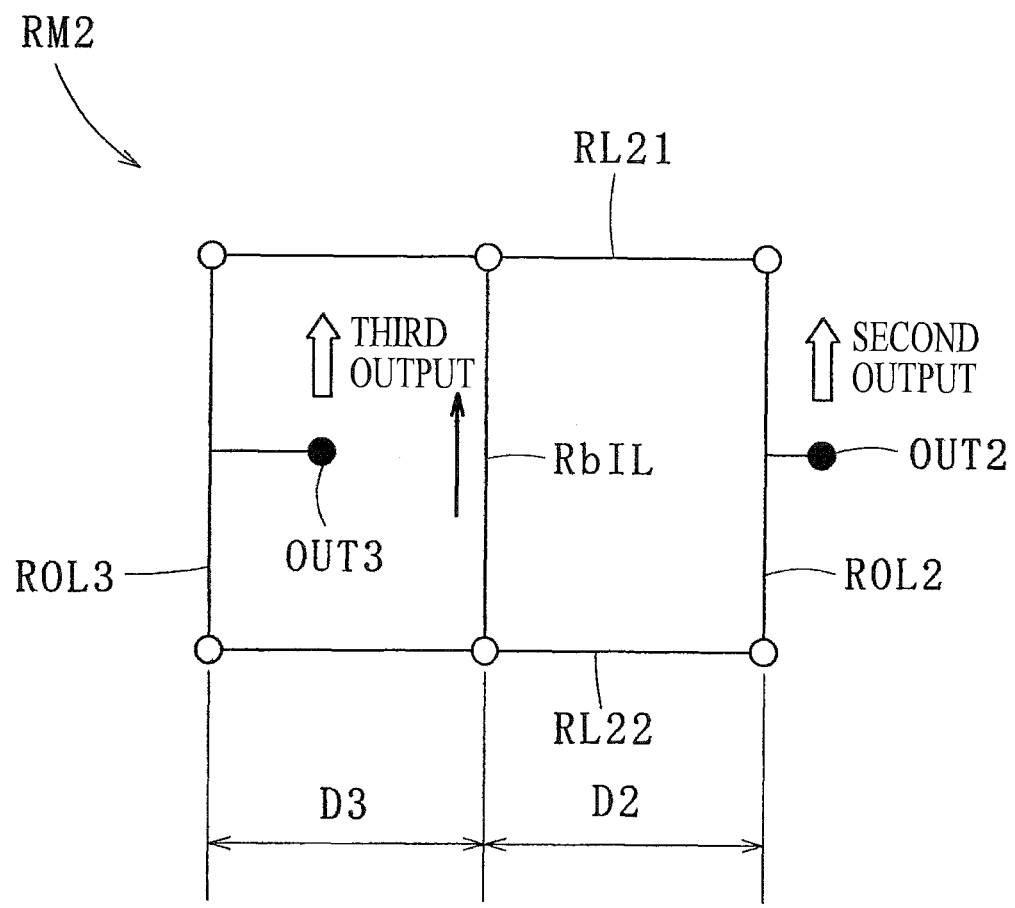
FIG. 15A is a schematic diagram of a second Roberval mechanism included in the robot hand.
Figure 15B:
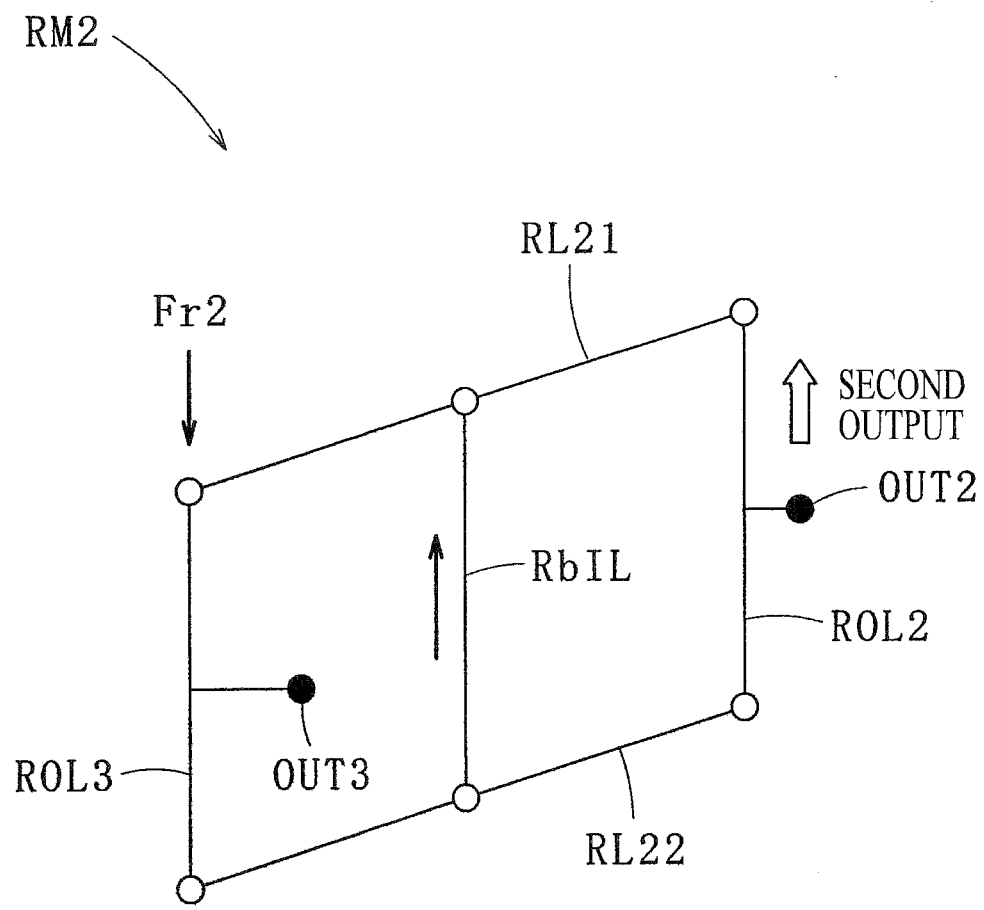
FIG. 15B is an explanatory drawing illustrating an operation of the second Roberval mechanism included in the robot hand.

The second Roberval mechanism RM2 divides the intermediate output which is output from the intermediate output link ML of the first Roberval mechanism RM1 into the second output for driving the second finger unit 22b and the third output for driving the third finger unit 22c. For example, as illustrated in FIG. 15A, the second Roberval mechanism RM2 includes an input link RbIL to which the intermediate output is input as a driving power, a second output link ROL2 which outputs a portion of the driving power that has been input, and a third output link ROL3 which outputs the remaining driving power that has been input. FIGS. 15A and 15B are schematic diagrams illustrating the second Roberval mechanism RM2 viewed from above.

The input link RbIL is arranged to be parallel to the moving direction of the cam plate CP. In FIG. 12, the link RL11 of the first Roberval mechanism RM1, the slider 52 which is the input link RaIL, and the link RL12 function as the input link RbIL. The intermediate output which is output from the intermediate output link ML (end portions J91 and J92 of the link RL11 and the link RL12, respectively, in the opposite side of the first output link ROL1) of the first Roberval mechanism RM1 is input to the input link RbIL (see FIG. 14A).

As illustrated in FIG. 15A, one of the end portions of the input link RbIL is pivotally connected to the middle portion of a link RL21 extending in the direction intersecting with the moving direction of the cam plate CP, in a plan view. The other end portion of the input link RbIL is pivotally connected to the middle portion of a link RL22 extending in the direction, intersecting with the moving direction of the cam plate CP in a plan view, and parallel to the link RL21.

The second output link ROL2 has the same length as the input link RbIL and is arranged to be parallel to the moving direction of the cam plate CP. One of the end portions of the second output link ROL2 is pivotally connected to the link RL21, and the other end portion is pivotally connected to the link RL22. The output unit OUT2 of the second output link ROL2 engages in a long hole H12 formed on a connecting lever 88b (see FIG. 2C). That is, the second output link ROL2 drives the cam plate CP via the connecting lever 88b.

As illustrated in FIG. 15A, the third output link ROL3 has the same length as the input link RbIL and is arranged to be parallel to the moving direction of the cam plate CP. One of the end portions of the third output link ROL3 is pivotally connected to the link RL21, and the other end portion is pivotally connected to the link RL22.

The output unit OUT3 of the third output link ROL3 engages in a long hole H13 formed on a connecting lever 88c (see FIG. 2C). That is, the third output link ROL3 drives the cam plate CP via the connecting lever 88c.

The second Roberval mechanism RM2 allows the input link RbIL and the second output link ROL2 to continue moving when the intermediate output is input to the input link RbIL, even when, for example, a force Fr2 which hinders the movement of the third output link ROL3 is applied to the third output link ROL3 as illustrated in FIG. 15B.

Note that, the ratio of the distance D1 which is the distance from the input link RaIL to the first output link ROL1, to the distance DM which is the distance from the input link RaIL to the intermediate output link ML may be set to 1:1 (see FIG. 14A). In this case, by setting the ratio of the distance D1 to the distance DM as described above, the driving power of the servo motor SVM1 is evenly divided, thereby setting the ratio of the first output to the intermediate output to be 1:1. Further, the ratio of the distance D2 which is the distance from the input link RbIL to the second output link ROL2, to the distance D3 which is the distance from the input link RbIL to the third output link ROL3 may be set to 1:1 (see FIG. 15A). In this case, by setting the ratio of the distance D2 to the distance D3 as described above, the intermediate output is evenly divided, thereby setting the ratio of the second output to the third output to be 1:1. That is, by setting the ratio of the amount of the first output to the intermediate output to be 1:1, and the ratio of the amount of the second output to the third output to be 1:1, the ratio of amounts of the first output for driving the first finger unit 22a, the second output for driving the second finger unit 22b, and the third output for driving the third finger unit 22c is determined to be 1.0:0.5:0.5. Thereby, the amount of force of the first finger unit 22a for grasping the object to be grasped is provided to balance with the total amount of forces of the second and third finger units 22b and 22c for grasping the object to be grasped.

Figure 16:
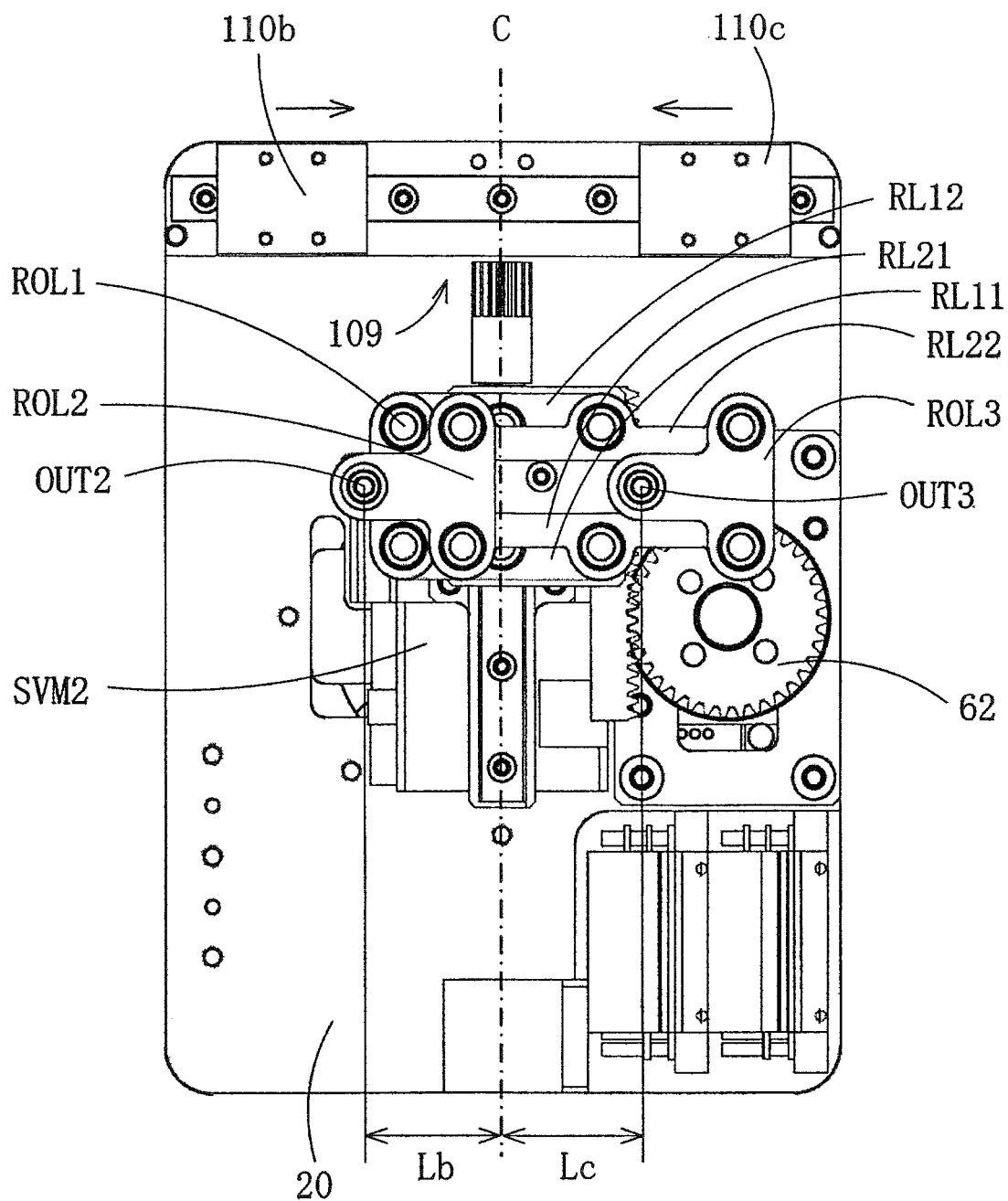
FIG. 16 is an explanatory drawing illustrating an arrangement of an output unit of the second Roberval mechanism included in the robot hand.

The output unit OUT2 of the second output link ROL2 may be arranged to be offset in the opposite side to the input link RbIL and at the same time, the output unit OUT3 of the third output link ROL3 may be arranged to be offset in the same side as the input link RbIL (the same side as the second output link ROL2), in a plan view. As illustrated in FIG. 16, the output unit OUT2 and the output unit OUT3 may be symmetrically arranged in the right side and the left side about the center line C. By arranging each of the output units OUT2 and OUT3 so as that the distance Lb from the output unit OUT2 to the center line C and the distance Lc from the output unit OUT3 to the center line C are the same, the same mechanical condition of the driving power can be provided to the second and third finger units 22b and 22c which are symmetrically arranged in the right side and the left side about the center line C.

Now, the operation of the robot hand 10 will be described. When the robot hand 10 is in an opened state, and the servo motor SVM1 is driven, the Roberval unit 30 is driven via the rack and pinion mechanism RP1. That is, the first Roberval mechanism RM1 and the second Roberval mechanism RM2 are driven and the output of the servo motor SVM1 is divided into the first to third outputs.

The first output is inverted via the connecting member 88a and the inverse unit 100 to be an inverted output, as illustrated in FIG. 13, which is input to the cam plate CP for driving the first finger unit 22a. The second output is input to the cam plate CP for driving the second finger unit 22b via the connecting lever 88b. The third output is input to the cam plate CP for driving the third finger unit 22c via the connecting lever 88c.

The cam plate CP applies the force Fin, in one direction, to the input unit INP. Along with the movement of the cam plate CP, the input unit moves upward in the long hole H1 (see FIG. 6A) which extends in the up-and-down direction, thereby carrying out closing operation of each of the finger units 22a, 22b, and 22c (see FIG. 4). As a result, when the distal end portion link member 42 (second grasping unit) grasps the object to be grasped, each of the finger units 22a, 22b, and 22c performs grabbing operation as illustrated in FIG. 5A. Further, when the conversion link member 41 (first grasping unit) grasps the object to be grasped or when the slider 76 is in contact with the first stopper 55, each of the finger units 22a, 22b, and 22c performs gripping operation by bending the distal end portion link member 42 (second grasping unit) as illustrated in FIG. 5B.

To describe in detail, the input link member IL drives the second parallel link mechanism PLM2 and the first parallel link mechanism PLM1 sharing the common link member CL with the second parallel link mechanism PLM2. In this process, since the conversion link member 41 constituting a part of the second parallel link mechanism PLM2 and the swing lever member SL constituting a part of the first parallel link mechanism PLM1 constitute the Scott Russell mechanism SRM, the distal end portion link member 42 moves under the condition in which the movement of the location P at the direction toward the distal end of the distal end portion link member 42 is restricted, as illustrated in FIG. 4. Further, since the notch 45 of the facing common link member CLf is kept to abut against the second stopper 57 by the tension force of the tension spring SP, the orientation of the common link member CL facing the facing common link member CLf is maintained. As a result, since the distal end portion link member 42 faces the common link member CL, the distal end portion link member 42 moves under the condition in which the movement of the orientation of the distal end portion link member 42 is restricted. That is, the grabbing operation is performed.

When the conversion link member 41 (first grasping unit) grasps the object to be grasped, the movement of the conversion link member 41 is restricted by the object to be grasped. Further, when the slider 76 makes contact with the first stopper 55, the movement of the conversion link member 41 is restricted by the first stopper 55. That is, in either case, the operation of the Scott Russell mechanism SRM is restricted, and thereby, the first parallel link mechanism PLM1 and the second parallel link mechanism PLM2 operate under the condition in which movements of the swing lever member SL and the conversion link member 41 are restricted. Specifically, since the common link member CL is made to pivot about the connecting portion J11 by the input link member IL, the distal end portion link member 42 located in the position so as to face the common link member CL also pivots, keeping the orientation parallel to the common link member CL. That is, the gripping operation is performed.

In the process of the robot hand 10 grasping the object to be grasped, even when one of the first to third finger units 22a, 22b, and 22c first makes contact with the object to be grasped, the rest of the finger units continue the operation since the rest of the finger units are driven by the Roberval unit 30. For example, when the third finger unit 22c first makes contact with the object to be grasped and a force Fr2 is applied to the third output link ROL3 as illustrated in FIG. 15B, the input link RbIL and the second output link ROL2 continue moving so that the first finger unit 22a and the second finger unit 22b continue the operation. As described above, since the output of the servo motor SVM1 is divided into three outputs by the Roberval unit 30, each of the first to third finger units 22a, 22b, and 22c is driven by using the single servo motor SVM1, thereby allowing the robot hand 10 to grasp the object to be grasped by grabbing or gripping. Further, by counter-rotating the servo motor SVM1, the closed finger unit 22 can be operated to open as described above, thereby allowing the robot hand 10 to release the object to be grasped.

The robot hand 10 further includes an adjusting unit which adjusts a distance Dp (see FIG. 2B) between the second finger unit 22b and the third finger unit 22c. By adjusting the distance Dp between the second finger unit 22b and the third finger unit 22c by the adjusting unit, the robot hand 10 can grasp an object to be grasped having different sizes.

As illustrated in FIG. 16, the adjusting unit includes a servo motor SVM2, a driving mechanism 109 (only a portion is illustrated in the drawing), and sliders 110b and 110c. The servo motor SVM2 is fixed on a frame 20 and is arranged so as the rotational axis of the motor shaft is lined along the center line C. A Roberval unit 30 is placed on the servo motor SVM2.

The driving mechanism 109 is configured with, for example, a rack and pinion mechanism including a pinion gear connected to the motor shaft and two rack gears each of which engages with the pinion gear so that the driving power of the servo motor SVM2 is divided into two driving powers which are output in directions opposite to each other.

The sliders 110b and 110c are driven by one and the other of the outputs, respectively, of the driving mechanism 109. Thereby, the sliders 110b and 110c move along the direction intersecting with the center line C so as to approach or distance each other. The second and third finger units 22b and 22c (not shown in FIG. 16) are placed on the sliders 110b and 110c, respectively.

Therefore, when the servo motor SVM2 rotates, the driving power of the servo motor SVM2 is divided into two driving powers of which directions are opposite to each other, by the driving mechanism 109. The divided driving power drives the sliders 110b and 110c. That is, when the servo motor SVM2 rotates, the distance Dp between the second finger unit 22b and the third finger unit 22c is adjusted.

As described above, the robot hand 10 of this embodiment is operated by under-actuation.

The present invention is not limited to the embodiment described above and can be modified without departing from the gist of the present invention. For example, the case in which the invention is configured by combining a portion of, or the whole of, the embodiment or the exemplary modification described above is included within the technical idea of the present invention.

In the embodiment described above, in the robot hand, the driving power of a motor is divided using the Roberval unit and all of the finger units are driven. Instead of the Roberval unit, motors for driving the finger unit, each corresponding to each of the finger units, may be provided.

The robot hand is not limited to the configuration having three finger units. For example, the robot hand may be configured to have two finger units arranged to face each other. That is, any configuration which includes at least two finger units may be included in the robot hand.

The tension spring is not limited to a spring which produces a tension force between the conversion link member and the facing conversion link member. As a first example, the tension spring may be configured as a spring producing a tension force between the conversion link member and the input link member. Further, as a second example, instead of the tension spring, a compression spring which produces a compression force between the facing conversion link member and the input link member may be used. That is, any spring produces a force for carrying out a predetermined operation of each mechanism until the conversion link member (first grasping unit) grasps the object to be grasped or the slider contacts the first stopper. Further, the tension spring and the compression spring may be provided in a mechanism other than the second parallel link mechanism. That is, any spring producing a force to close the conversion link member may be provided.

The second stopper is provided so as to make contact with the facing common link member, thereby restricting the pivoting of the facing common link member within a predetermined range. However, it is not limited to such configuration. For example, the second stopper may be provided so as to make contact with the common link member, thereby restricting the pivoting of the common link member within a predetermined range. Thereby, the change in orientation of the distal end portion link member during the grabbing operation will be restricted.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A robot hand comprising:
   a frame; and
   at least two finger units provided on the frame and capable of grasping an object to be grasped,
   wherein each of the finger units includes
      a finger frame provided on the frame,
      a Scott Russell mechanism including a swing lever member and a conversion link member, a one end portion of the swing lever member pivotally connected to the finger frame, an other end portion of the swing lever pivotally connected to a connecting portion located in a middle portion of the conversion link member, and a moving direction of a one end portion of the conversion link member intersecting with a moving direction of an other end portion of the conversion link member when the other end portion of the conversion link member moves closer to or away from the one end portion of the swing lever member,
      a first parallel linkage including the swing lever member and a common link member, the common link member pivotally connected to the connecting portion, and the other end portion of the swing lever member and the common link member connected to each other via the connecting portion, and
      a second parallel linkage including the common link member, the conversion link member, a distal end portion link member and a facing conversion link member, the conversion link member and the facing conversion link member extending so as to be substantially parallel, the common link member pivotally connected to one end portion of the facing conversion link member, the distal end portion link member pivotally connected to the one end portion of the conversion link member and an other end portion of the facing conversion link member, respectively.

2. The robot hand according to claim 1, further comprising an input link member pivotally connecting each of the common link member and the distal end portion link member, and a cam plate applying a force to the input link member when the cam plate is moved in a direction intersecting with the moving direction of the other end portion of the conversion link member.

3. The robot hand according to claim 2, further comprising a spring which applies a force to close the conversion link member.

4. The robot hand according to claim 1, further comprising a tension spring producing a tension force between the conversion link member and the facing conversion link member.

5. The robot hand according to claim 4, wherein the tension spring is a coil spring and a longitudinal direction of the tension spring intersects with an extending direction of the conversion link member.

6. The robot hand according to claim 2, further comprising a tension spring producing a tension force between the conversion link member and the facing conversion link member.

7. The robot hand according to claim 6, wherein the tension spring is a coil spring and a longitudinal direction of the tension spring intersects with an extending direction of the conversion link member.

8. The robot hand according to claim 1, further comprising a spring which applies a force to close the conversion link member.

9. A robot hand comprising:
   a frame;
   first to third finger units provided on the frame and capable of grasping an object to be grasped;
   a Roberval unit driving the first to third finger units; and
   a servo motor provided on the frame and driving the Roberval unit,
   wherein each of the first to third finger units includes
      a finger frame provided on the frame,
      a Scott Russell mechanism including a swing lever member and a conversion link member, a one end portion of the swing lever member pivotally connected to the finger frame, an other end portion of the swing lever pivotally connected to a connecting portion located in a middle portion of the conversion link member, and a moving direction of a one end portion of the conversion link member intersecting with a moving direction of an other end portion of the conversion link member when the other end portion of the conversion link member moves closer to or away from the one end portion of the swing lever member, a first parallel linkage including the swing lever member and a common link member, the common link member pivotally connected to the connecting portion, and the other end portion of the swing lever member and the common link member connected to each other via the connecting portion, and a second parallel linkage including the common link member, the conversion link member, a distal end portion link member and a facing conversion link member, the conversion link member and the facing conversion link member extending so as to be substantially parallel, the common link member pivotally connected to a one end portion of the facing conversion link member, the distal end portion link member pivotally connected to the one end portion of the conversion link member and an other end portion of the facing conversion link member, respectively, and wherein the Roberval unit includes a first Roberval mechanism dividing an output of the servo motor into an intermediate output and a first output driving the first finger unit, and a second Roberval mechanism dividing the intermediate output into a second output driving the second finger unit and a third output driving the third finger unit.

10. The robot hand according to claim 9, wherein the frame has first and second edge portion sides opposing each other, the first finger unit is arranged on the first edge portion side of the frame, the second and third finger units are arranged on the first edge portion side of the frame, and the first to third outputs are set such that a force of the first finger unit capable of grasping the object to be grasped balances with a total amount of forces of the second and third finger units capable of grasping the object to be grasped.

11. A robot comprising a robot hand including a frame and at least two finger units provided on the frame and capable of grasping an object to be grasped, wherein each of the finger units includes a finger frame provided on the frame, a linkage including a swing lever member and a conversion link member, a one end portion of the swing lever member pivotally connected to the finger frame, another end portion of the swing lever pivotally connected to a connecting portion located in a middle portion of the conversion link member, and a moving direction of a one end portion of the conversion link member intersecting with a moving direction of an other end portion of the conversion link member when the other end portion of the conversion link member moves closer to or away from the one end portion of the swing lever member, a first parallel linkage including the swing lever member and a common link member, the common link member pivotally connected to the connecting portion, and the other end portion of the swing lever member and the common link member connected to each other via the connecting portion, and a second linkage including the common link member, the conversion link member, a distal end portion link member and a facing conversion link member, the conversion link member and the facing conversion link member extending so as to be substantially parallel, the common link member pivotally connected to a one end portion of the facing conversion link member, the distal end portion link member pivotally connected to the one end portion of the conversion link member and an other end portion of the facing conversion link member, respectively.

* * * * *